(12) United States Patent
Aedudodla et al.

(10) Patent No.: US 8,095,076 B2
(45) Date of Patent: Jan. 10, 2012

(54) METHODS AND SYSTEMS FOR LOW-COMPLEXITY CHANNEL ESTIMATOR IN OFDM / OFDMA SYSTEMS

(75) Inventors: Sandeep Reddy Aedudodla, Superior, CO (US); Tommy Ray Guess, Lafayette, CO (US)

(73) Assignee: Qualcomm Incorporated, San Diego, CA (US)

( * ) Notice: Subject to any disclaimer, the term of this patent is extended or adjusted under 35 U.S.C. 154(b) by 522 days.

(21) Appl. No.: 12/365,953

(22) Filed: Feb. 5, 2009

(65) Prior Publication Data

US 2010/0197241 A1    Aug. 5, 2010

(51) Int. Cl.
    *H04B 17/00*    (2006.01)
(52) U.S. Cl. ..................... 455/67.13; 375/350
(58) Field of Classification Search ............... 455/67.13; 375/350
    See application file for complete search history.

(56) References Cited

U.S. PATENT DOCUMENTS

| | | | |
|---|---|---|---|
| 6,640,088 B2 * | 10/2003 | Thomas et al. | 455/67.11 |
| 7,181,177 B2 * | 2/2007 | Pauli et al. | 455/101 |
| 7,340,257 B2 * | 3/2008 | Heddergott et al. | 455/450 |
| 7,756,483 B2 * | 7/2010 | Chang et al. | 455/67.13 |
| 2003/0128656 A1 | 7/2003 | Scarpa | |
| 2005/0105647 A1 | 5/2005 | Wilhelmsson et al. | |
| 2005/0286406 A1 | 12/2005 | Jeon et al. | |
| 2008/0049814 A1 | 2/2008 | Jeon | |

OTHER PUBLICATIONS

Yi Li, et al., Robust Channel Estimation for OFDM Systems with Rapid Dispersive Fading Channels, IEEE Transactions on Communications, vol. 46, No. 7, pp. 902-915 (Jul. 1998).
Standard for Local and Metropolitan Area Networks, Part 16: Air Interface for Broadband Wireless Access Systems, Section 8.3.6.3 Optional adjacent subcarrier permutations for AMC, IEEE, P802.16Rev2/D6, pp. 995-997 (Jul. 2008).
Standard for Local and Metropolitan Area Networks, Part 16: Air Interface for Broadband Wireless Access Systems, Section 8.3.6.2.1 Symbol structure for subchannel (PUSC), IEEE, P802.16Rev2/D6, pp. 1015-1017(Jul. 2008).
International Search Report and Written Opinion—PCT/US10/023247, International Search Authority—European Patent Office, May 11, 2010.

* cited by examiner

*Primary Examiner* — Kenneth B. Wells
(74) *Attorney, Agent, or Firm* — Milan Patel

(57) ABSTRACT

The present disclosure proposes a method for channel estimation with excellent accuracy for a large variety of channel conditions and with low computational complexity. The method represents a specific combination of a plurality of linear channel estimation schemes. A resulting hybrid channel estimator may retain the low complexity of the constituent estimators while performing same or better than each of the constituent estimators. The proposed simplified hybrid estimator may provide very close error rate performance to the optimal Wiener estimator over a wide range of channel scenarios.

28 Claims, 15 Drawing Sheets

METHODS AND SYSTEMS FOR LOW-COMPLEXITY CHANNEL ESTIMATOR IN OFDM / OFDMA SYSTEMS

TECHNICAL FIELD

The present disclosure generally relates to wireless communications and, more specifically, to a method for channel estimation.

SUMMARY

Certain embodiments of the present disclosure provide a method for estimating a channel in a wireless communication system. The method generally includes computing values of scaling parameters using an estimated signal-to-noise ratio (SNR) value and a two-dimensional auto-correlation function (2D-ACF) of the channel, obtaining approximated values of scaling parameters based on the estimated value of SNR, if the estimated SNR value is known at the receiver and if the 2D-ACF is not known at the receiver, determining a linear combination of interpolation matrices that correspond to different constituent channel estimators based on computed scaling parameters, and calculating channel estimates at locations in a tile other than pilot locations in the tile by using the determined interpolation matrix and known channel estimates at the pilot locations.

Certain embodiments of the present disclosure provide an apparatus for estimating a channel in a wireless communication system. The apparatus generally includes logic for computing values of scaling parameters using an estimated signal-to-noise ratio (SNR) value and a two-dimensional auto-correlation function (2D-ACF) of the channel, logic for obtaining approximated values of scaling parameters based on the estimated value of SNR, if the estimated SNR value is known at the receiver and if the 2D-ACF is not known at the receiver, logic for determining a linear combination of interpolation matrices that correspond to different constituent channel estimators based on computed scaling parameters, and logic for calculating channel estimates at locations in a tile other than pilot locations in the tile by using the determined interpolation matrix and known channel estimates at the pilot locations.

Certain embodiments of the present disclosure provide an apparatus for estimating a channel in a wireless communication system. The apparatus generally includes means for computing values of scaling parameters using an estimated signal-to-noise ratio (SNR) value and a two-dimensional auto-correlation function (2D-ACF) of the channel, means for obtaining approximated values of scaling parameters based on the estimated value of SNR, if the estimated SNR value is known at the receiver and if the 2D-ACF is not known at the receiver, means for determining a linear combination of interpolation matrices that correspond to different constituent channel estimators based on computed scaling parameters, and means for calculating channel estimates at locations in a tile other than pilot locations in the tile by using the determined interpolation matrix and known channel estimates at the pilot locations.

Certain embodiments of the present disclosure provide a computer-program product for estimating a channel in a wireless communication system, comprising a computer readable medium having instructions stored thereon, the instructions being executable by one or more processors. The instructions generally include instructions for computing values of scaling parameters using an estimated signal-to-noise ratio (SNR) value and a two-dimensional auto-correlation function (2D-ACF) of the channel, instructions for obtaining approximated values of scaling parameters based on the estimated value of SNR, if the estimated SNR value is known at the receiver and if the 2D-ACF is not known at the receiver, instructions for determining a linear combination of interpolation matrices that correspond to different constituent channel estimators based on computed scaling parameters, and instructions for calculating channel estimates at locations in a tile other than pilot locations in the tile by using the determined interpolation matrix and known channel estimates at the pilot locations.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
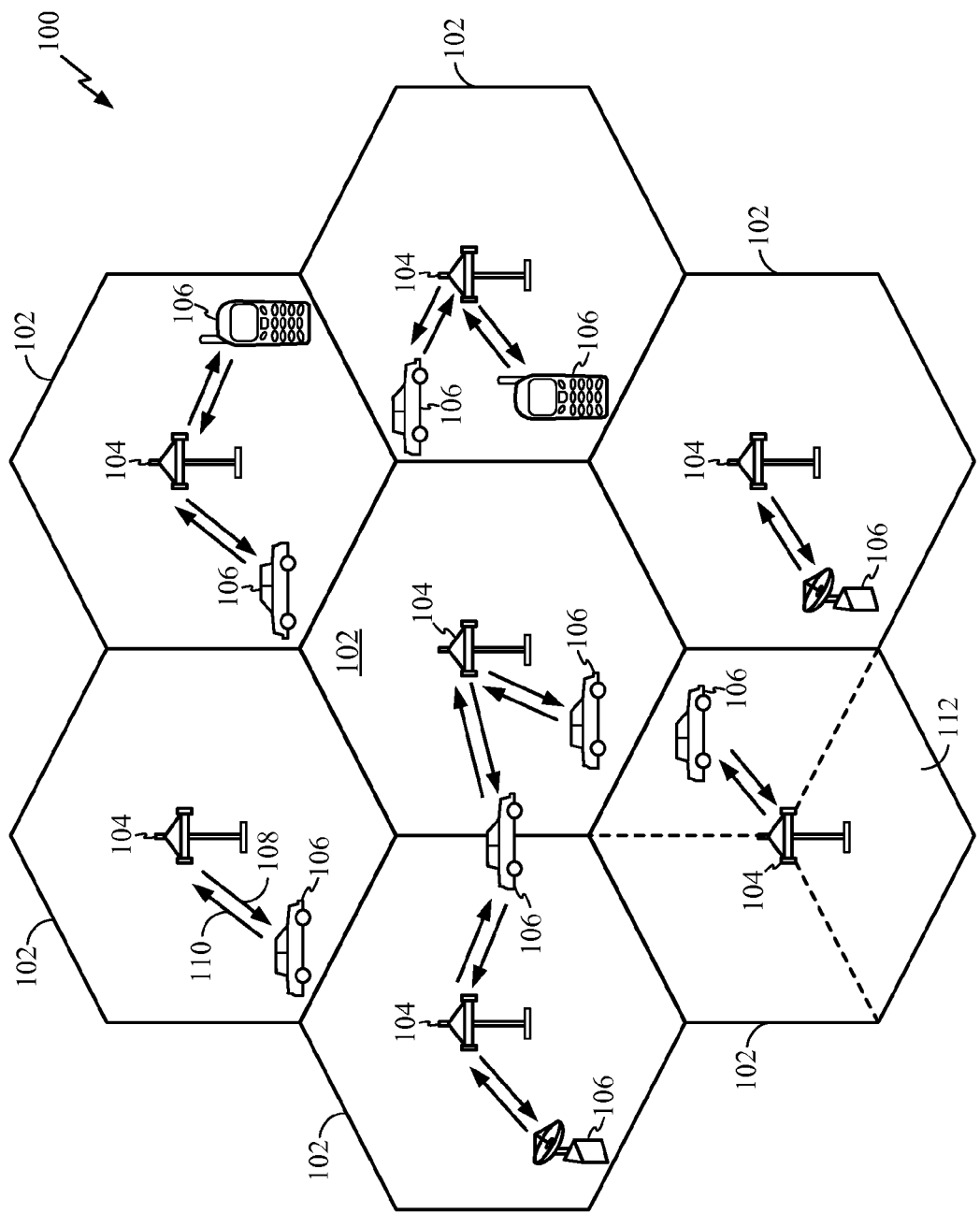
FIG. 1 illustrates an example wireless communication system, in accordance with certain embodiments of the present disclosure.

The word "exemplary" is used herein to mean "serving as an example, instance, or illustration." Any embodiment described herein as "exemplary" is not necessarily to be construed as preferred or advantageous over other embodiments.

An Orthogonal Frequency Division Multiplexing (OFDM) and an Orthogonal Frequency Division Multiple Access (OFDMA) are powerful techniques for transmitting data by partitioning a wideband wireless channel into a set of narrowband channels. An equalization of narrowband channels at a receiver, which is necessary to cancel effects of frequency selectivity, is more efficient than the equalization of the corresponding wideband channel. However, the equalization of narrowband channels assumes an accurate knowledge of the channel response across a time-frequency grid.

Typically, the knowledge of the channel may be acquired at the receiver in two ways—either by transmitting a training signal or a pilot signal. In the first case, a transmitter may allocate a portion of the time-frequency grid for sending the known training signal that the receiver can utilize to estimate a channel response for the training portion of the time-frequency grid. The estimated channel response can be then used as a pattern to estimate the channel response for the portion of the grid that contains data signal. In the second case, known pilot tones may be scattered amongst data on the time-frequency grid and the receiver can utilize received pilot tones to estimate the channel at pilot locations. Channel estimates at locations dedicated for transmission of data symbols may be obtained by interpolating previously computed channel estimates at pilot locations.

The ideal linear channel estimator in terms of minimizing the mean square error (MSE) between real and estimated channel response is the well-known Wiener interpolator. However, the Wiener interpolator requires knowledge of the signal power, the noise power, and the second-order statistics of the channel (e.g., the two-dimensional autocorrelation function). Since the channel estimator at the receiver does not typically know the second-order statistics of the channel, the ideal linear estimator only represents a bound on the accuracy of channel estimation.

A practical approach to channel estimation may be a class of least-square estimators that function independently of the explicit knowledge of the channel. The least-square estimators may employ a set of pilots in a certain region of the time-frequency grid to estimate the full channel response over that region by using a curve-fitting procedure based on the least-square algorithm. Examples of the least-square estimators may include: an averaging estimator that estimates a constant component of the channel over the specific region; a plane-fit estimator that estimates the constant component, a slope in time and a slope in frequency components of the channel over the specific region; a quadratic-fit estimator that is further refined from the plane-fit estimator by including second-order components of the channel over the specific region such as time-squared, frequency-squared, and time-frequency cross product components.

The advantage of the least-square estimators compared to the Wiener estimator is that the knowledge of the second-order statistics of the channel may not be required. However, the accuracy of least-square estimators may be sacrificed because of the lack of such knowledge.

There are several factors involved in the channel estimation, namely time-selectivity of the channel (caused by a Doppler effect), frequency-selectivity of the channel (caused by a plurality of channel paths), and a signal-to-noise ratio (SNR) that affects a relative quality of the received pilots. The least-square channel estimators with higher order (e.g., the quadratic-fit estimator) may be better able to capture a high selectivity of the channel, but these estimators may also tend to "fit to the noise" if the SNR is not large enough. Conversely, the least-square estimators with lower order (e.g., the averaging estimator) may perform well in relatively non-selective channels, but do not perform well at larger SNR. Thus, any particular least-square estimator may perform well under some set of channel conditions, but may perform very poorly under other conditions.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
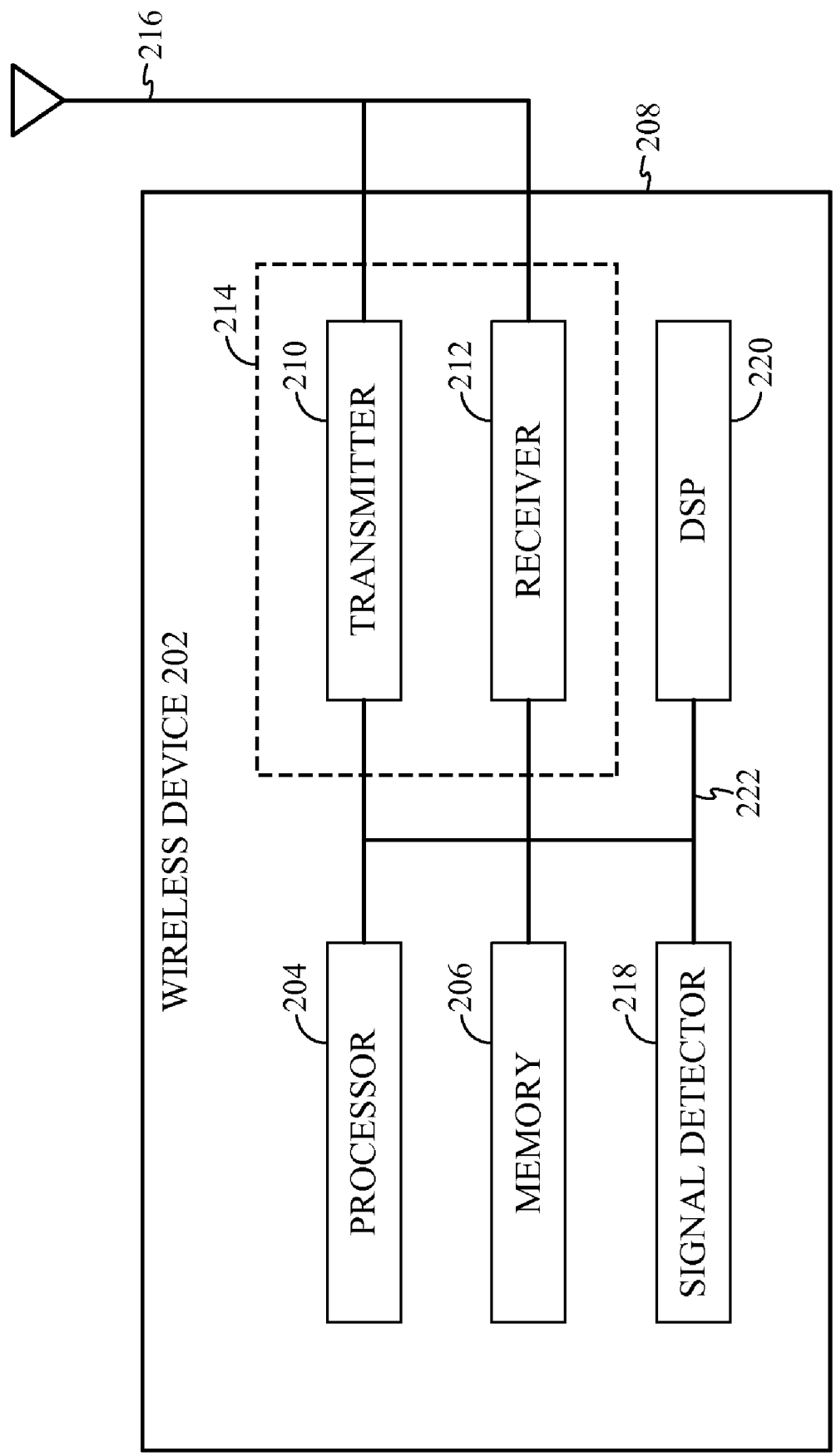
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
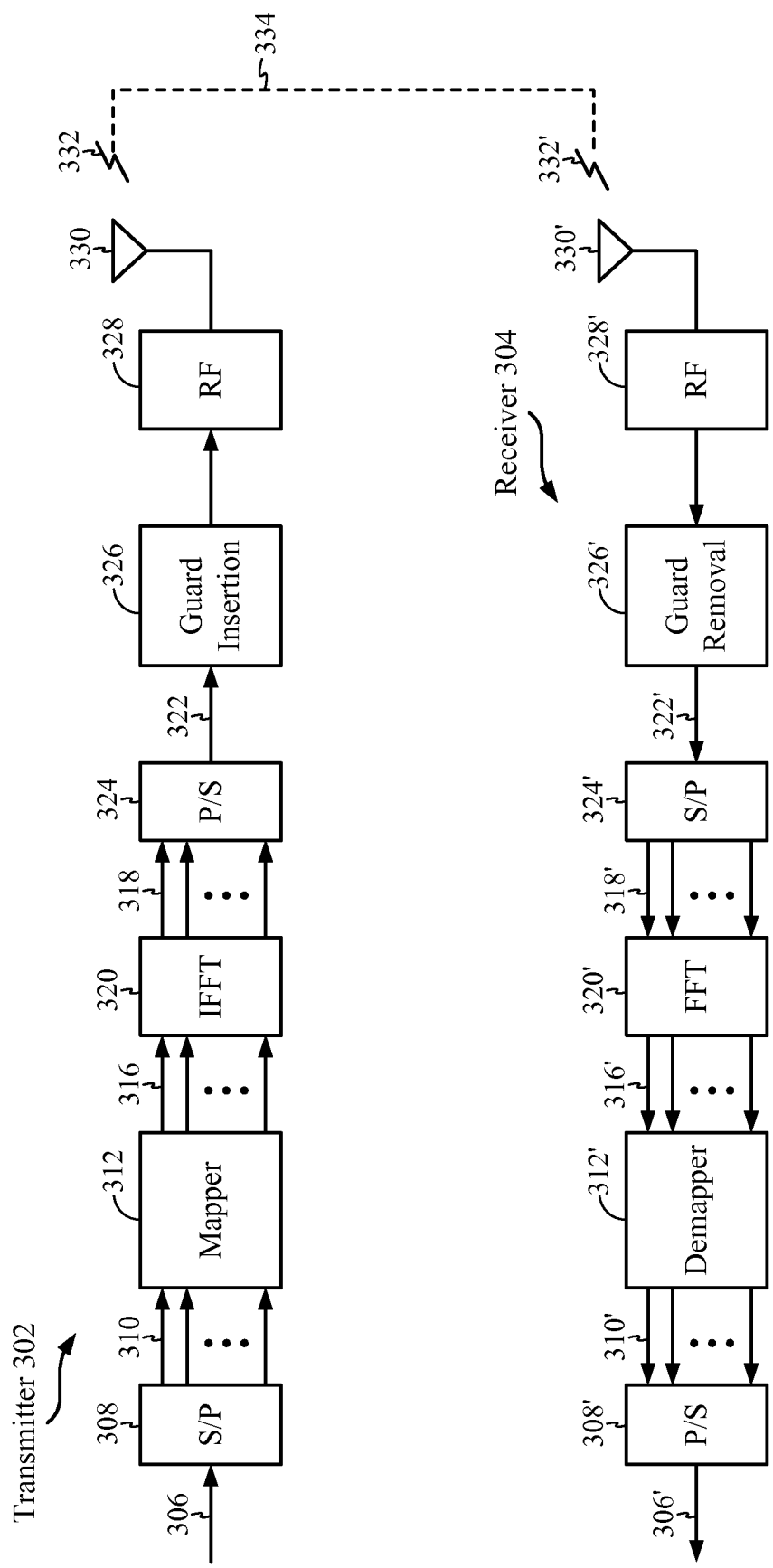
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, NS, is equal to NCP (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 340'.

Exemplary System Model and Channel Estimation Algorithms

Certain embodiments of the present disclosure generally provide a technique for channel estimation in OFDM and OFDMA systems is proposed. The method represents a specific combination of a plurality of low-complexity linear channel estimation schemes. A resulting hybrid channel estimator may retain the low complexity of the constituent estimators while performing as well or better than each individual constituent estimator. Moreover, performance of the hybrid estimator may be comparable to the optimal Wiener estimator over a wide range of channel scenarios.

A wireless transmission can be assumed to be in the form of an N×M tile, i.e., comprising N frequency subcarriers and M OFDM symbols. The tile may contain K pilot tones, where K<N·M. The matrix H may denote the discretized channel response, where the element Hn,m denotes the channel at the nth subcarrier and the mth OFDM symbol in the tile, where $0 \leq n \leq N-1$ and $0 \leq m \leq M-1$. It can be assumed that the channel is a zero-mean and wide-sense stationary (WSS). The corresponding two-dimensional (2D) autocorrelation function (ACF) may be defined as:

$$E[H_{i,j}H_{k,l}^*] = R_H(i-k, j-l). \tag{1}$$

The impulse response of the channel may consists of L paths and can be expressed as:

$$h[n] = \sum_{l=0}^{L-1} h_l \delta(t - \tau_l), \tag{2}$$

where the gain of the lth channel path is denoted by $h_l$, which may be a complex Gaussian random variable and the path delay is denoted by $\tau_l$.

Equation (2) may be used to calculate equation (1), and the 2D-ACF of the channel may be expressed as the following function separable in time and frequency:

$$E[H_{n,m}H_{l,k}^*] = R_H(n-l, m-k) = r(n-l)s(m-k), \tag{3}$$

where the channel autocorrelation in frequency can be expressed as:

$$r(n-l) = \sum_{l=0}^{L-1} p_l \exp(-j2\pi(n-l)\Delta f \tau_l) \tag{4}$$

with the power of the lth path denoted by $p_l$. The autocorrelation in time may be given by the Jakes model as:

$$s(m-k) = J_0(2\pi f_D(m-k)T_s), \tag{5}$$

where $J_0(x)$ is the Bessel function of the first kind defined as:

$$J_0(x) = \sum_{m=0}^{\infty} \frac{(-1)^m}{(m!)^2} \left(\frac{x}{2}\right)^{2m}. \tag{6}$$

$T_s$ is the OFDM symbol duration, $\Delta f$ is the subcarrier spacing and the Doppler shift is denoted by $f_D$.

If the transmitted signal at the (n, m)th location in the tile is denoted by $X_{n,m}$, then the received signal after the Inverse Discrete Fourier Transform (IDFT) can be represented as:

$$Y_{n,m} = H_{n,m}X_{n,m} + n_{n,m}, \tag{7}$$

where $n_{n,m}$ is a zero-mean complex Gaussian noise process with $E[n_{i,j}n_{k,l}^*] = \sigma_n^2 \delta_{i-k, j-l}$, where $\sigma_n^2$ is the noise power and $\delta_{m,n}$ is the two-dimensional Kronecker delta function, which equals one for m=n=0 and zero otherwise.

Exemplary Pilot and Data Structure

Figure 4:
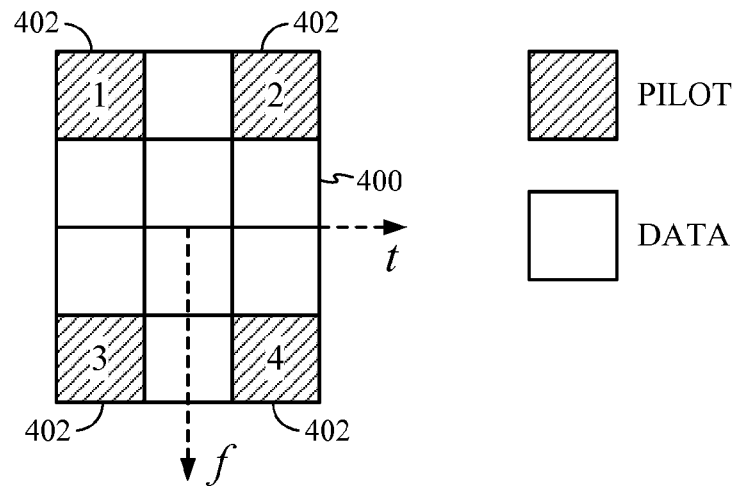
FIG. 4 illustrates a structure and pilot locations for an uplink partially used subcarriers (UL-PUSC) tile type in accordance with certain embodiments of the present disclosure.

Several pilot/data structures (or tile types) may be considered in the present disclosure. The tile structure for an uplink partially used subcarriers (UL-PUSC) permutation zone is shown in FIG. 4. It can be noted that the tile 400 may consist of N=4 tones by M=3 symbols with K=4 pilot 402 at its corners. The tiles of the UL-PUSC permutation zone, corresponding to a particular mobile station (MS), may not be contiguous over physical subcarriers. Similarly, unless a rotation of sub-channel is turned off, subcarriers may not be contiguous over time. Therefore, tiles corresponding to the particular MS may not be scattered across the time-frequency grid. FIG. 4 illustrates an isolated UL-PUSC tile 400, and a center of the tile is assumed to be in the origin.

Figure 5:
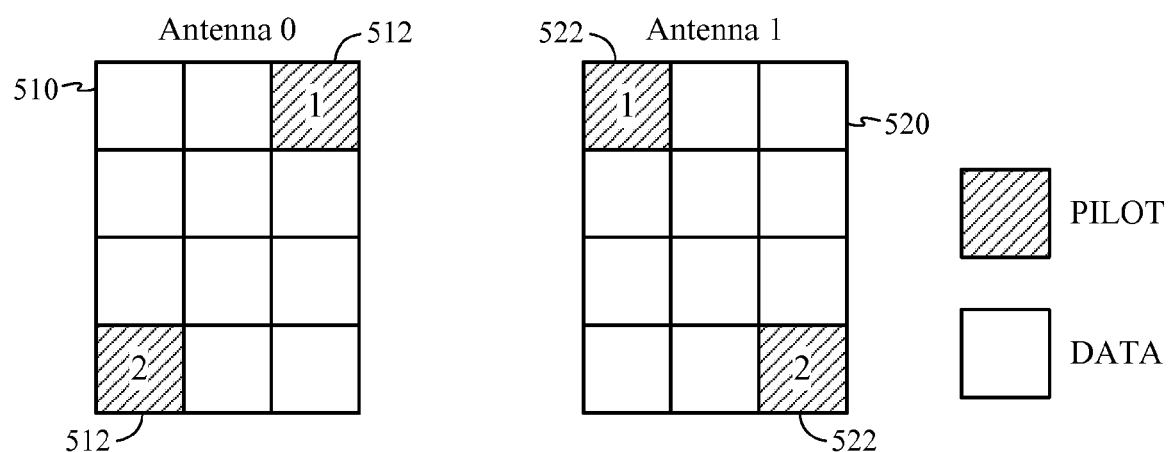
FIG. 5 illustrates a structure and pilot locations for the UL-PUSC tile type with space-time coding at a transmitter in accordance with certain embodiments of the present disclosure.

If a space-time coding (STC) is supported for the UL-PUSC zone, for certain embodiments of the present disclosure a user with two antennas may transmit two pilots per each antenna in the tile as shown in FIG. 5. The tile 510 may be transmitted from antenna 0 along with two pilot tones 512 at its corners, and a tile 520 may be transmitted from antenna 1 along with two pilot tones 522 at its corners. The channel estimation for each transmit antenna may be performed independently. Due to the availability of only two pilots per each antenna, the only reasonable option for channel estimation may be to average the individual channel estimates at two pilot locations.

Figure 6:
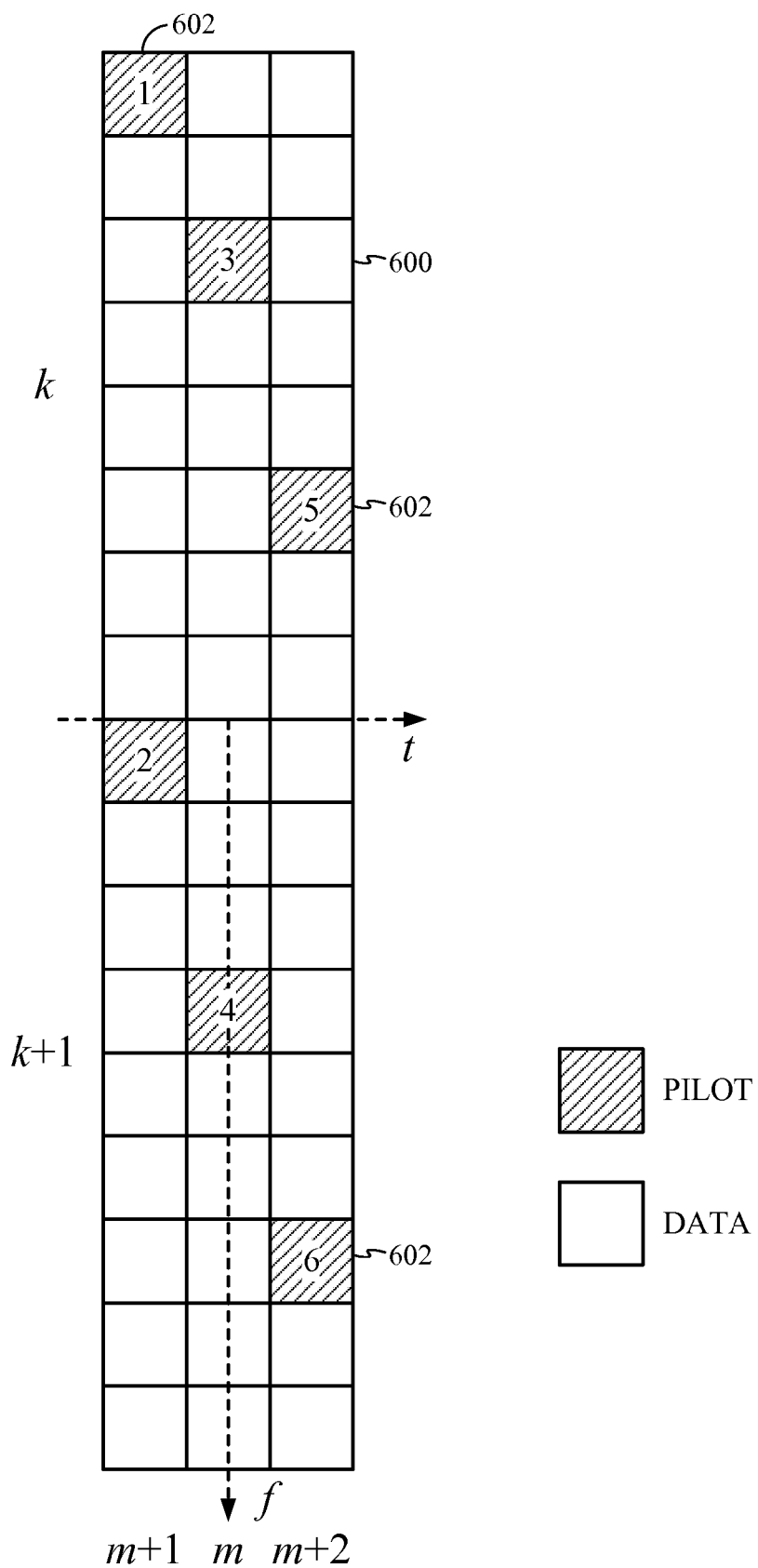
FIG. 6 illustrates a structure and pilot locations for an adaptive modulation and coding (AMC) 2×3 tile type in accordance with certain embodiments of the present disclosure.

The tile structure and pilot locations for an adaptive modulation and coding (AMC) 2×3 permutation zone are illustrated in FIG. 6. The tile 600 for the AMC 2×3 zone consists of N=18 tones by M=3 symbols with K=6 pilots 602. The pilot locations for AMC 2×3 may be given by formula 9k+3m+1, where k denotes the bin number with each bin containing nine subcarriers, and m denotes the OFDMA symbol number. It can be assumed that the center of the tile is in the origin. Due to the availability of larger number of pilots per tile than in the case of the UL-PUSC zone, higher order channel estimators may be utilized for the AMC 2×3 tile types.

Exemplary Channel Estimation Algorithms

Let $h_\pi$ denote a vector containing individual channel estimates at the K pilots, which can be assumed to be at locations $(n_1, m_1), (n_1, m_1), \ldots, (n_K, m_K)$ in the tile. The kth element of the vector $h_\pi$ is denoted by $h_{\pi, k}$ and may be determined by $h_{\pi, k} = Y_{n_k, m_k} / X_{n_k, m_k}$ for k=1, ..., K.

Given $h_\pi$, the goal of channel estimation may be to obtain channel estimates $\hat{H}_{n,m}$ at all locations in the tile other than at pilot locations. A channel covariance matrix of size K×K at pilot locations may be denoted as $\Sigma_{\pi\pi} = E[h_\pi h_\pi^H]$, whose $(k_1, k_2)$th element may be computed as:

$$E[h_{\pi,k_1} h_{\pi,k_2}] = R_H(n_{k_1} - n_{k_2}, m_{k_1} - m_{k_2}) + \sigma_\eta^2 \delta_{n_{k_1}-n_{k_2}, m_{k_1}-m_{k_2}}. \quad (8)$$

Simplified expressions for the mean-squared error (MSE) may be obtained for different channel estimation methods. In the present disclosure, linear estimators of the form $\hat{H} = Gh_\pi$ may be considered, where G represents an interpolation matrix. For each estimator, we define the normalized MSE per element of the tile as:

$$e^2 = \frac{1}{NM} \sum_{n=0}^{N-1} \sum_{m=0}^{M-1} e_{n,m,norm}^2, \quad (9)$$

where $$e_{n,m,norm}^2 = \frac{1}{R_H(0,0)} E[\|H_{n,m} - \hat{H}_{n,m}\|^2].$$

A theoretical bound on the performance of the channel estimation is first described by presenting the ideal Wiener estimator/interpolator. Following that, several suboptimal least-square channel estimators implementable in practice are overviewed.

The Wiener estimator is the linear estimator that results in the minimum MSE (MMSE) estimate. It generally provides an unachievable bound on the estimation accuracy. The bound is unachievable since it requires the knowledge of the 2D-ACF of the channel. The Wiener estimator for the channel at an arbitrary location (n, m) in the tile may be expressed as:

$$\hat{H}_{n,m} = E[H_{n,m} h_\pi^H] E[h_\pi h_\pi^H]^{-1} h_\pi = \quad (10)$$

$$= c_{\pi,nm} \Sigma_{\pi\pi}^{-1} h_\pi,$$

where the 1×K vector $c_{\pi,nm} \equiv E[H_{n,m} h_\pi^H]$ is given by:

$$c_{\pi,nm} = [R_H(n-n_1, m-m_1) R_H(n-n_2, m-m_2) \ldots R_H(n-n_K, m-m_K)] \quad (11)$$

The normalized MSE of the Wiener estimator may be computed as:

$$e_{n,m,norm-wiener}^2 = 1 - \frac{1}{R_H(0,0)} c_{\pi,nm} \Sigma_{\pi\pi}^{-1} c_{\pi,nm}^H \quad (12)$$

The simple averaging estimator may interpolate the channel at each element in the tile as the simple average of all known pilots in the tile. The averaging estimator may be expressed as:

$$\hat{H}_{n,m} = g_{avg} h_\pi, \quad (13)$$

where the 1×K interpolation vector $g_{avg} = [1/K \; 1/K \ldots 1/K]$. The normalized MSE for the averaging estimator given by equation (13) may be expressed as:

$$e_{n,m,norm-avg}^2 = 1 - \frac{1}{R_H(0,0)} (2\text{Re}\{c_{\pi,nm} g_{avg}^H\} - g_{avg} \Sigma_{\pi\pi} g_{avg}^H). \quad (14)$$

The following model of the channel response may be assumed for designing a least-square plane-fit estimator:

$$h(t, f) = \frac{k_t}{T_s} \cdot t + \frac{k_f}{\Delta f} \cdot f + k_{dc}, \quad (15)$$

where $T_s$ is the OFDM symbol duration and $\Delta f$ is the subcarrier spacing. Assuming that the center of the tile is in the origin, the least-square estimates for the coefficient vector $\theta_{pf} = [k_t \; k_f \; k_{dc}]^T$ may be obtained by using channel estimates at pilot locations $h_\pi$ as:

$$\hat{\theta}_{pf} = (A_{pf}^T A_{pf})^{-1} A_{pf}^T h_\pi, \quad (16)$$

where the K×3 observation matrix $A_{pf}$ corresponding to the UL-PUSC and the AMC 2×3 tile types may be defined respectively as:

$$A_{pf} = \begin{bmatrix} -1 & -3/2 & 1 \\ 1 & -3/2 & 1 \\ -1 & 3/2 & 1 \\ 1 & 3/2 & 1 \end{bmatrix}, \quad (17)$$

$$A_{pf} = \begin{bmatrix} -1 & -17/2 & 1 \\ -1 & 1/2 & 1 \\ 0 & -11/2 & 1 \\ 0 & 7/2 & 1 \\ 1 & -5/2 & 1 \\ 1 & 13/2 & 1 \end{bmatrix}. \quad (18)$$

The pseudo-inverse of the observation matrix $A_{pf}$ may be calculated as $A'_{pf} = (A_{pf}^T A_{pf}) A_{pf}^T$. After obtaining the estimate $\hat{\theta}_{pf}$, channel estimates for all locations in the tile other than pilot locations may be determined as:

$$\hat{H}_{n,m} = g_{pf,nm} A'_{pf} h_\pi, \quad (19)$$

where the 1×3 row vector $g_{pf,nm}$ depends upon positions n and m in the tile, and it is defined for the UL-PUSC tile type and the AMC 2×3 tile type respectively as:

$$g_{pf,nm} = [m-1 \; n-3/21] \text{ for } 0 \leq m \leq 2 \text{ and } 0 \leq n \leq 3, \quad (20)$$

$$g_{pf,nm} = [m-1 \; n-17/21] \text{ for } 0 \leq m \leq 2 \text{ and } 0 \leq n \leq 18. \quad (21)$$

The normalized MSE for the plane-fit estimator may be given as:

$$e_{n,m,norm-pf}^2 = \quad (22)$$

$$1 - \frac{1}{R_H(0,0)} (2\text{Re}\{c_{\pi,nm} A'_{pf} g_{pf,nm}^H\} - g_{pf,nm} \Sigma_{\pi\pi} A'_{pf}^H g_{pf,nm}^H).$$

If larger number of pilots is available in the tile, such as for the AMC 2×3 tile type, higher order estimators may also be employed. One such estimator is a least-square quadratic-fit estimator that may utilize the following model of the channel response:

$$h(t,f) = k_{t2}\left(\frac{t}{T_s}\right)^2 + k_{f2}\left(\frac{f}{\Delta f}\right)^2 + k_{tf}\left(\frac{tf}{T_s\Delta f}\right) + k_t\left(\frac{t}{T_s}\right) + k_f\left(\frac{f}{\Delta f}\right) + k_{dc}. \quad (23)$$

Assuming that the center of the tile is in the origin, the least-square estimates for the coefficient vector $\theta_{qf}=[k_{t2}\ k_{f2}\ k_{tf}\ k_t\ k_f\ k_{dc}]^T$ may be obtained using the channel estimates at pilot locations $h_\pi$ as:

$$\hat{\theta}_{qf}=(A_{qf}^T A_{qf})^{-1} A_{qf}^T h_\pi, \quad (24)$$

where the K×6 observation matrix $A_{qf}$ for the AMC 2×3 tile type may be given as:

$$A_{qf} = \begin{bmatrix} 1 & 289/4 & 17/2 & -1 & -17/2 & 1 \\ 1 & 1/4 & -1/2 & -1 & 1/2 & 1 \\ 0 & 121/4 & 0 & 0 & -11/2 & 1 \\ 0 & 49/4 & 0 & 0 & 7/2 & 1 \\ 1 & 25/4 & -5/2 & 1 & -5/2 & 1 \\ 1 & 169/4 & 13/2 & 1 & 13/2 & 1 \end{bmatrix}. \quad (25)$$

However, since the AMC 2×3 sub-channel has six pilots as illustrated in FIG. 6, the reduced-order quadratic-fit estimators may be considered that estimate five or fewer coefficients from equation (23) instead of all six coefficients.

It can be assumed the following channel model for designing a quadratic-fit estimator with t2 coefficient (beside linear and constant coefficients):

$$h(t,f) = k_{t2}\left(\frac{t}{T_s}\right)^2 + k_t\left(\frac{t}{T_s}\right) + k_f\left(\frac{f}{\Delta f}\right) + k_{dc}. \quad (26)$$

The coefficient vector may be denoted by $\theta_{qf,t^2}=[k_{t2}\ k_t\ k_f\ k_{dc}]^T$, whose least-squares estimate is obtained as $\hat{\theta}_{qf,t^2}=(A_{qf,t^2}^T A_{qf,t^2})^{-1} A_{qf,t^2}^T h_\pi$ where the K×4 observation matrix $A_{qf,t^2}$ for the AMC 2×3 tile type may be defined as:

$$A_{qf,t^2} = \begin{bmatrix} 1 & -1 & -17/2 & 1 \\ 1 & -1 & 1/2 & 1 \\ 0 & 0 & -11/2 & 1 \\ 0 & 0 & 7/2 & 1 \\ 1 & 1 & -5/2 & 1 \\ 1 & 1 & 13/2 & 1 \end{bmatrix}. \quad (27)$$

The channel estimates for the quadratic-fit estimator with t2 coefficient may be given by:

$$\hat{H}_{n,m}=g_{qf,t^2,nm}A'_{qf,t^2}h_\pi, \quad (28)$$

where the vector $g_{qf,t^2,nm}=[(m-1)^2\ m-1\ n-17/2\ 1]$ for $0\leq m\leq 2$ and $0\leq n\leq 18$.

The following channel model may be defined for designing the quadratic-fit estimator with f2 coefficient (beside linear and constant coefficients):

$$h(t,f) = k_{f2}\left(\frac{f}{\Delta f}\right)^2 + k_t\left(\frac{t}{T_s}\right) + k_f\left(\frac{f}{\Delta f}\right) + k_{dc}. \quad (29)$$

The coefficient vector may be denoted by $\theta_{qf,f^2}=[k_{f2}\ k_t\ k_f\ k_{dc}]^T$, whose least-squares estimate may be obtained as $\hat{\theta}_{qf,f^2}=(A_{qf,f^2}^T A_{qf,f^2})^{-1} A_{qf,f^2}^T h_\pi$, where the K×4 observation matrix $A_{qf,f^2}$ for the AMC 2×3 tile type may be defined as:

$$A_{qf,f^2} = \begin{bmatrix} 289/4 & -1 & -17/2 & 1 \\ 1/4 & -1 & 1/2 & 1 \\ 121/4 & 0 & -11/2 & 1 \\ 49/4 & 0 & 7/2 & 1 \\ 25/4 & 1 & -5/2 & 1 \\ 169/4 & 1 & 13/2 & 1 \end{bmatrix}. \quad (30)$$

The channel estimates for the quadratic-fit estimator with f2 coefficient may be given as:

$$\hat{H}_{n,m}=g_{qf,f^2,nm}A'_{qf,f^2}h_\pi, \quad (31)$$

where the vector $g_{qf,f^2,nm}=[(n-17/2)^2\ m-1\ n-17/2\ 1]$ for $0\leq m\leq 2$ and $0\leq n\leq 18$.

The following channel model may be defined for designing the quadratic-fit estimator with both t2 and f2 coefficients (beside linear and constant coefficients):

$$h(t,f) = k_{t2}\left(\frac{t}{T_s}\right)^2 + k_{f2}\left(\frac{f}{\Delta f}\right)^2 + k_t\left(\frac{t}{T_s}\right) + k_f\left(\frac{f}{\Delta f}\right) + k_{dc}. \quad (32)$$

The coefficient vector may be denoted by $\theta_{qf,t^2,f^2}=[k_{t2}\ k_{f2}\ k_t\ k_f\ k_{dc}]^T$, whose least-squares estimate may be obtained as $\hat{\theta}_{qf,t^2,f^2}=(A_{qf,t^2,f^2}^T A_{qf,t^2,f^2})^{-1} A_{qf,t^2,f^2}^T h_\pi$, where the K×5 observation matrix $A_{qf,t^2,f^2}$ for the AMC 2×3 tile type may be defined as:

$$A_{qf,t^2,f^2} = \begin{bmatrix} 1 & 289/4 & -1 & -17/2 & 1 \\ 1 & 1/4 & -1 & 1/2 & 1 \\ 0 & 121/4 & 0 & -11/2 & 1 \\ 0 & 49/4 & 0 & 7/2 & 1 \\ 1 & 25/4 & 1 & -5/2 & 1 \\ 1 & 169/4 & 1 & 13/2 & 1 \end{bmatrix}. \quad (33)$$

The channel estimates for the quadratic-fit estimator with both t2 and f2 coefficients may be given as:

$$\hat{H}_{n,m}=g_{qf,t^2,f^2,nm}A'_{qf,t^2,f^2}h_\pi, \quad (34)$$

where the vector $g_{qf,t^2,f^2,nm}=[(m-1)^2\ (n-17/2)^2\ m-1\ n-17/2\ 1]$ for $0\leq m\leq 2$ and $0\leq n\leq 18$.

Following the previously described channel estimation, the noise power may be estimated from the individual channel estimates at pilot locations as:

$$\hat{\sigma}^2 = \frac{1}{K}\sum_{i=1}^{K}\left|h_{\pi,i}\hat{H}(n_i,m_i)\right|^2. \quad (35)$$

Figure 7:
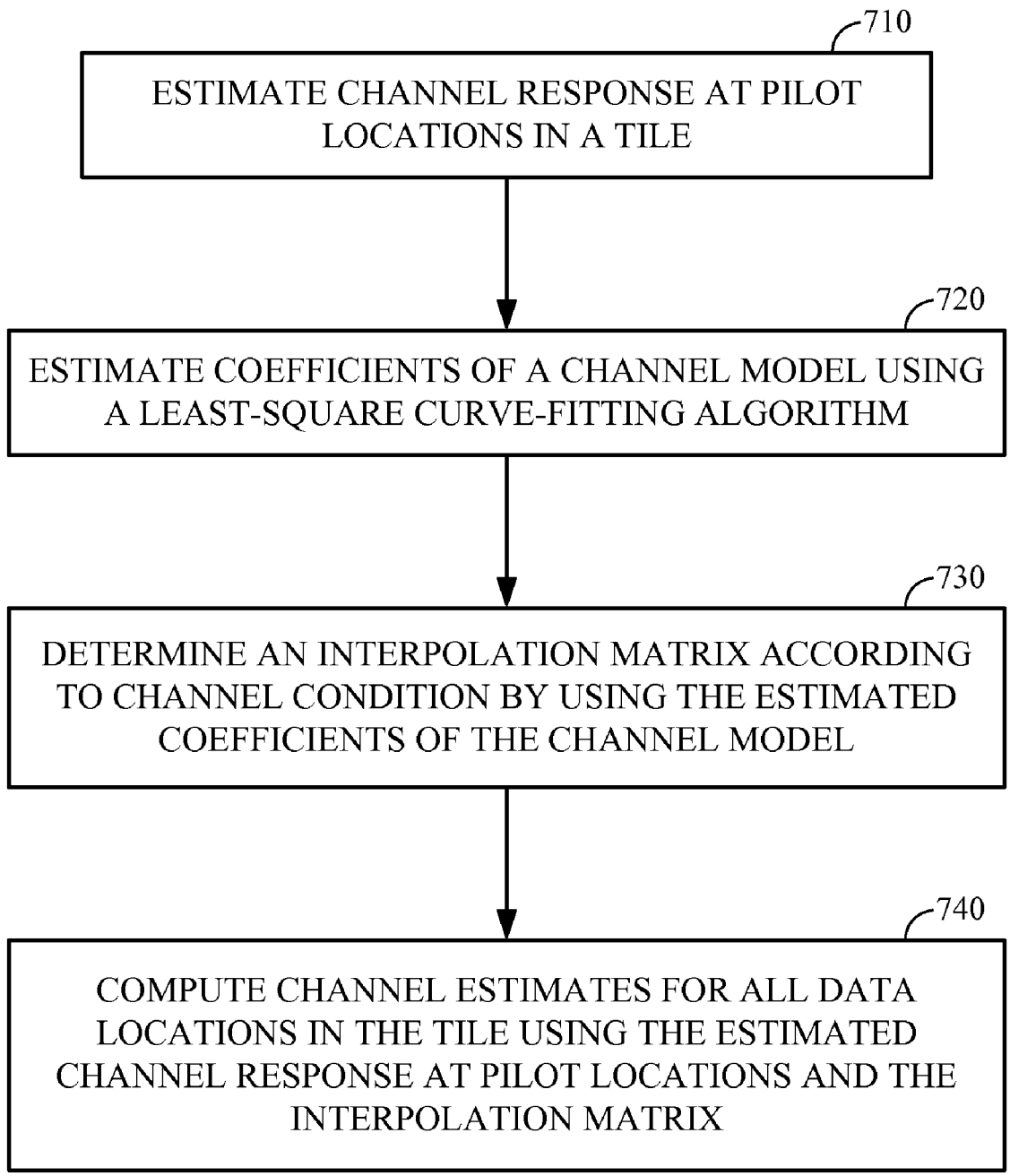
FIG. 7 illustrates a process of channel estimation in accordance with certain embodiments of the present disclosure.

FIG. 7 summarizes a process of channel estimation that is previously described for different estimators. At 710, the channel response may be estimated at pilot locations in the tile. At 720, the coefficients from the channel model may be estimated using the least-square curve-fitting algorithm. The interpolation matrix may be then determined by utilizing estimated coefficients, at 730. More details will follow in the present disclosure on how to determine the interpolation matrix according to channel conditions in order to achieve excellent estimation accuracy for a large variety of channel scenarios. At 740, the channel estimates for all locations in the tile other than the pilot locations may be computed using the estimated channel response at the pilot locations and the determined interpolation matrix.

Exemplary Hybrid Channel Estimation

Hybrid channel estimation may be proposed in the present disclosure whose MSE performance may transition between MSE performances of previously described estimators. The design of the hybrid channel estimator for the UL-PUSC tile type with one or more transmit antennas in the system may be considered, where the hybrid estimator may be implemented that exhibits improved error rate performance. It is also proposed in the present disclosure how its implementation complexity can be reduced without sacrificing the error rate performance. A similar hybrid estimator may be also proposed for the AMC 2×3 tile type.

In the case of the UL-PUSC tile type, the plane-fit estimator may perform well at higher values of signal-to-noise ratio (SNR), because it may efficiently track channel variations. On the other hand, at lower values of SNR, the averaging estimator may perform better than the plane-fit estimator because the averaging method may not end up fitting to the noise at low SNR.

The hybrid estimator may combine good properties of these two estimators, namely the error rate performance at different SNR values and low implementation complexity. The hybrid estimator that combines the averaging and the plane-fit estimators may be expressed using equation (13) and equation (19) as:

$$\hat{H}_{n,m}[\alpha g_{pf,nm} A'_{pf} + (1-\alpha) g_{avg}] h_{rx}, \quad (36)$$

where the parameter $\alpha$ may be set to one at high values of SNR in order to obtain the performance benefits of the plane-fit estimator, and may be set to zero at low values of SNR in order to achieve error rate performance of the averaging estimator for that particular SNR region.

The value of $\alpha$ that minimizes the MSE of this particular hybrid estimator may be given by:

$$\alpha_{opt} = \frac{1}{2NM} \frac{\sum_{i=0}^{N-1}\sum_{j=0}^{M-1} 2Re\{c_{\pi,nm}A'_{pf}g^H_{pf,nm}\} - 2Re\{c_{\pi,nm}g^H_{avg}\} + 2g_{avg}\Sigma_{\pi\pi}g^H_{avg} - 2Re\{g_{pf,nm}A'_{pf}\Sigma_{\pi\pi}g^H_{avg}\}}{\sum_{i=0}^{N-1}\sum_{j=0}^{M-1} g_{pf,nm}A'_{pf}\Sigma_{\pi\pi}A'^H_{pf}g^H_{pf,nm} + g_{avg}\Sigma_{\pi\pi}g^H_{avg} - 2Re\{g_{pf,nm}A'_{pf}\Sigma_{\pi\pi}g^H_{avg}\}}. \quad (37)$$

It can be observed that the exact computation of $\alpha_{opt}$ from equation (37) may require knowledge of the SNR and of the 2D-ACF of the channel, (i.e., a matrix $\Sigma_{\pi\pi}$ from equation (37) may need to be known).

The ideal Wiener channel estimator may approach zero at very low SNR values. This fact may be utilized to weigh the hybrid estimator with the factor $\beta$, which may have the effect of pulling the estimator towards zero at very low values of SNR. The hybrid estimator that combines the Wiener estimator, the averaging estimator and the plane-fit estimator may be expressed as:

$$\hat{H}_{n,m} = \beta[\alpha g_{pf,nm}A'_{pf} + (1-\alpha)g_{avg}]h_{rx}. \quad (38)$$

Thus, the factor $\beta$ may enable a transition between averaging and the Wiener estimators. Therefore, the hybrid estimator given by equation (38) may transition between the Wiener, averaging and plane-fit estimators depending upon the SNR value. The optimum value of $\beta$ to minimize the MSE can be shown to be:

$$\beta_{opt} = \frac{1}{NM} \frac{\sum_{i=0}^{N-1}\sum_{j=0}^{M-1} Re\{c_{\pi,nm}g^H_{avg}\}}{\sum_{i=0}^{N-1}\sum_{j=0}^{M-1} g_{avg}\Sigma_{\pi\pi}g^H_{avg}}. \quad (39)$$

The hybrid estimator may be also defined for the AMC 2×3 tile type that may take advantage of good properties of both the averaging estimator and the quadratic-fit estimator with f2 coefficient. The development of this particular hybrid estimator may be similar to that for the previously proposed UL-PUSC hybrid estimator. The hybrid estimator for the AMC 2×3 tile type may be therefore expressed as:

$$\hat{H}_{n,m} = \beta[\alpha g_{qf,f^2,nm}A'_{qf,f^2} + (1-\alpha)g_{avg}]h_{rx}. \quad (40)$$

The optimum values for parameters $\alpha$ and $\beta$ that minimize the MSE can be shown to be:

$$\alpha_{opt} = \frac{1}{2NM} \frac{\sum_{i=0}^{N-1}\sum_{j=0}^{M-1} 2Re\{c_{\pi,nm}A'_{qf,f^2}g^H_{qf,f^2,nm}\} - 2Re\{c_{\pi,nm}g^H_{avg}\} + 2g_{avg}\Sigma_{\pi\pi}g^H_{avg} - 2Re\{g_{qf,f^2,nm}A'_{qf,f^2}\Sigma_{\pi\pi}g^H_{avg}\}}{\sum_{i=0}^{N-1}\sum_{j=0}^{M-1} g_{qf,f^2,nm}A'_{qf,f^2}\Sigma_{\pi\pi}A'^H_{qf,f^2}g^H_{qf,f^2,nm} + g_{avg}\Sigma_{\pi\pi}g^H_{avg} - 2Re\{g_{qf,f^2,nm}A'_{qf,f^2}\Sigma_{\pi\pi}g^H_{avg}\}}, \quad (41)$$

$$\beta_{opt} = \frac{1}{NM} \frac{\sum_{i=0}^{N-1}\sum_{j=0}^{M-1} Re\{c_{\pi,nm}g^H_{avg}\}}{\sum_{i=0}^{N-1}\sum_{j=0}^{M-1} g_{avg}\Sigma_{\pi\pi}g^H_{avg}}. \quad (42)$$

In general, the hybrid estimator may be defined as a linear combination of N different interpolation matrices, $\{G_i\}$, i= 1 . . . N, according to:

$$G_{hybrid} = \alpha_1 G_1 + \alpha_2 G_2 + \ldots + \alpha_N G_N. \quad (43)$$

With proper choice of parameters $\{\alpha_i\}$, i=1, . . . , N, the hybrid estimator may be designed to perform better than or equal to each individual interpolation matrix $\{G_i\}$. Such a generalization may be useful for pilot schemes in which a larger number of pilots may be available for channel estimation. In this particular case, a higher order least-square fitting such as the quadratic-fit estimator may be incorporated into the hybrid method. In practice, one might have a separate, coarsely computed, $\alpha$ parameter for transitioning between various pairs of constituent least-square estimators.

Exemplary Approximate SNR Offset for Transitioning Between Different Linear Estimators Certain embodiments of the present disclosure proposes a method to determine the value of SNR as a function of the channel parameters, such as Doppler frequency and delay spread for which the hybrid estimator may transition from one linear estimator to another. As an illustrative example, the hybrid estimator that combines two linear estimators may be considered:

$$G = (1-\alpha)G_1 + \alpha G_2, \quad (44)$$

which may vary linearly between estimator $G_1$ when $\alpha=0$ and $G_2$ when $\alpha=1$. For a given channel, the optimum value of $\alpha$ to minimize the MSE may be derived as:

$$\alpha = \frac{X + Y + N_0 Z}{A + N_0 B}, \quad (45)$$

where $$X = tr(\Sigma_{:\pi}(G_2 - G_1)^H)$$

$$Y = tr((G_2 - G_1)\Sigma_{\pi\pi} G_1^H)$$

$$Z = tr((G_2 - G_1) G_1^H) \quad (46)$$

$$A = tr((G_2 - G_1)\Sigma_{\pi\pi}(G_2 - G_1)^H)$$

$$B = tr((G_2 - G_1)(G_2 - G_1)^H)$$

In the case of the UL-PUSC tile type, it can be observed that the optimal value of parameter α as a function of the SNR may be essentially the same for all channel scenarios modulo a constant SNR shift. This observation may hold when $G_1$ is the averaging estimator and $G_2$ is the plane-fit estimator. The goal may be to determine the amount of SNR shift, ideally as a function of parameters such as the maximum Doppler and the maximum channel delay spread.

Based on this configuration, it may be found that Y=Z=0 and B=11/3 regardless of the channel correlation matrix. Equation (45) may be solved for the value of SNR (defined as $1/N_0$) when parameter α=½:

$$\frac{1}{2} = \frac{X}{A + \frac{11}{3} B / SNR} \Rightarrow SNR = \frac{11}{3(2X - A)}. \quad (47)$$

For all analyzed channels, it is true that X≈A. Therefore, equation (47) may be simplified to:

$$SNR \approx \frac{11}{3A}. \quad (48)$$

The value of A from equation (48) may depend on channel characteristics, which in turn affect the amount of SNR offset.

The interpolation matrix $G_1$ of the averaging estimator may be a 12×4 matrix whose every element is ¼. On the other hand, the interpolation matrix of the plane-fit estimator may be defined as:

$$G_2 = \begin{bmatrix} 3/4 & 1/4 & 1/4 & -1/4 \\ 7/12 & 5/12 & 1/12 & -1/12 \\ 5/12 & 7/12 & -1/12 & 1/12 \\ 1/4 & 3/4 & -1/4 & 1/4 \\ 1/2 & 0 & 1/2 & 0 \\ 1/3 & 1/6 & 1/3 & 1/6 \\ 1/6 & 1/3 & 1/6 & 1/3 \\ 0 & 1/2 & 0 & 1/2 \\ 1/4 & -1/4 & 3/4 & 1/4 \\ 1/12 & -1/12 & 7/12 & 5/12 \\ -1/12 & 1/12 & 5/12 & 7/12 \\ -1/4 & 1/4 & 1/4 & 3/4 \end{bmatrix}. \quad (49)$$

Therefore $$G_2 - G_1 = \begin{bmatrix} 1/2 & 0 & 0 & -1/2 \\ 1/3 & 1/6 & -1/6 & -1/3 \\ 1/6 & 1/3 & -1/3 & -1/6 \\ 0 & 1/2 & -1/2 & 0 \\ 1/4 & -1/4 & 1/4 & -1/4 \\ 1/12 & -1/12 & 1/12 & -1/12 \\ -1/12 & 1/12 & -1/12 & 1/12 \\ -1/4 & -1/2 & 1/2 & 1/4 \\ 0 & 1/2 & -1/2 & 0 \\ -1/6 & -1/3 & 1/3 & 1/6 \\ -1/3 & -1/6 & 1/6 & 1/3 \\ -1/2 & 0 & 0 & 1/2 \end{bmatrix}. \quad (50)$$

The matrix given by equation (50) may only has rank 2, and the following expression may be written:

$$(G_2 - G_1)^H (G_2 - G_1) = \quad (51)$$

$$\begin{bmatrix} -1/2 & -1/2 \\ -1/2 & 1/2 \\ 1/2 & -1/2 \\ 1/2 & 1/2 \end{bmatrix} \begin{bmatrix} 5/3 & 0 \\ 0 & 2 \end{bmatrix} \begin{bmatrix} -1/2 & -1/2 & 1/2 & 1/2 \\ -1/2 & 1/2 & -1/2 & 1/2 \end{bmatrix}.$$

When the autocorrelation matrix Σ comes from a time-frequency separable channel, it may be expressed as the following convolution:

$$\Sigma = S \otimes R, \quad (52)$$

where S is the autocorrelation matrix for the time variation across the tile and R is the autocorrelation matrix for the frequency variation across the tile. Moreover, since the pilots for the UL-PUSC zone may be located at its corners, equation (52) may become:

$$\Sigma_{\Pi\Pi} = \begin{bmatrix} 1 & s \\ s & 1 \end{bmatrix} \otimes \begin{bmatrix} 1 & r \\ r & 1 \end{bmatrix} = \begin{bmatrix} 1 & r & s & sr \\ r & 1 & sr & s \\ s & sr & 1 & r \\ sr & s & r & 1 \end{bmatrix}, \quad (53)$$

where s is the correlation between two channel samples at the same frequency that are two symbols apart, and r is the correlation between two channel samples at the same OFDM symbol that are three frequency tones apart. The eigen-decomposition of the matrix given by equation (53) may be computed as:

$$\begin{bmatrix} 1 & r & s & sr \\ r & 1 & sr & s \\ s & sr & 1 & r \\ sr & s & r & 1 \end{bmatrix} = \begin{bmatrix} 1/2 & -1/2 & -1/2 & 1/2 \\ -1/2 & -1/2 & 1/2 & 1/2 \\ -1/2 & 1/2 & -1/2 & 1/2 \\ 1/2 & 1/2 & 1/2 & 1/2 \end{bmatrix} \quad (54)$$

$$\begin{bmatrix} (1+|r|)(1+|s|) & 0 & 0 & 0 \\ 0 & J & 0 & 0 \\ 0 & 0 & K & 0 \\ 0 & 0 & 0 & (1+|r|)(1+|s|) \end{bmatrix}$$

$$\begin{bmatrix} 1/2 & -1/2 & -1/2 & 1/2 \\ -1/2 & -1/2 & 1/2 & 1/2 \\ -1/2 & 1/2 & -1/2 & 1/2 \\ 1/2 & 1/2 & 1/2 & 1/2 \end{bmatrix},$$

where $$J = (1+|r|)(1-|s|) \text{ and } K = (1-|r|)(1+|s|). \quad (55)$$

It is important to notice that the eigenvectors from equation (51) may be also the eigenvectors of J and K from equation (54). Therefore, the following may be written:

$$A = tr\left(\begin{bmatrix} J & 0 \\ 0 & K \end{bmatrix} \begin{bmatrix} 5/3 & 0 \\ 0 & 2 \end{bmatrix}\right) = \frac{5}{3}J + 2K. \quad (56)$$

If equation (56) is substituted back into equation (48), then the following expression may be obtained:

$$SNR \approx \frac{11}{3\left(\frac{5}{3}J + 2K\right)} = \frac{1}{1+(|s|-|r|)/11 - |r||s|} \approx \frac{1}{1-|r||s|}. \quad (57)$$

The value of SNR in units of dB at which the optimal α crosses the value of one-half may be approximately computed as:

$$SNR_{dB} \approx -10 \log_{10}(1-|r||s|). \quad (58)$$

As it is already discussed, at very small values of SNR the Wiener estimator may tend toward zero since observations may be too noisy to have any confidence in channel estimates. In order to transition between the Wiener estimator and the averaging estimator, the 4×12 interpolator $G_1 = 0$ and the interpolator $G_2$ with every single entry equal to ¼ may be utilized.

In this particular case $G_2 - G_1 = G_2$ and from equation (46) it can be found that Y=Z=0 and B=3. Moreover, it is true that X≈A. Therefore, parameter α=½ at:

$$SNR \approx \frac{3}{A} = \frac{3}{\frac{3}{4}\sum_{i,j \in \Pi} \Sigma_{ij}} = \frac{4}{\sum_{i,j \in \Pi} \Sigma_{ij}}. \quad (59)$$

The denominator summation from equation (59) is equal to 4(1+r)(1+s) or in dB units:

$$SNR_{dB} \approx -10 \log_{10}((1+r)(1+s)). \quad (60)$$

The result obtained in equation (60) means that as the channel selectivity (in time and frequency) decreases, the SNR crossing point may move to the left (i.e., to lower values of SNR). Therefore, the averaging estimator may be beneficial for lower values of SNR.

Let $T_d$ denotes the maximum significant channel delay spread in units of seconds. If the channel delay profile is approximated as a square pulse of width $T_d$, then the spectrum of the frequency selectivity would be the sinc function that may be represented as:

$$R(f) = \frac{\sin(\pi T_d f)}{\pi T_d f} \equiv \text{sinc}(T_d f). \quad (61)$$

For the channel bandwidth specified by the WiMAX standard of 10 MHz, the subcarrier spacing may be $\Delta f = 10937.5$ Hz, and the approximate correlation of the channel at a given OFDM symbol across a separation of three tones may be:

$$r \approx |\text{sinc}(3T_d \Delta f)|. \quad (62)$$

Let $F_d$ denotes the maximum Doppler frequency in units of Hz. If the Doppler spectrum is approximated as band-limited and flat over $[-F_d, F_d]$ (note that Jakes spectrum may not be flat, but band-limited across this particular frequency band), then the spectrum of the frequency selectivity would be the sinc function given as:

$$S(t) = \frac{\sin(\pi 2 F_d t)}{\pi 2 F_d t} \equiv \text{sinc}(2 F_d t). \quad (63)$$

For the channel bandwidth specified by the WiMAX standard of 10 MHz, the OFDM symbol spacing may be $T_{sym} = 102.86 \times 10^{-6}$ seconds, and the approximate correlation of the channel at a given tone over a separation of two symbols may be:

$$s \approx |\text{sinc}(4 F_d T_{sym})|. \quad (64)$$

Therefore, the approximated offset of the SNR for transitioning between the averaging estimator and the plane fitting estimator may be determined according to equation (58) as:

$$SNR_{dB} \approx -10 \log_{10}(1 - |\text{sinc}(3T_d \Delta f)| \cdot |\text{sinc}(4 F_d T_{sym})|). \quad (65)$$

The approximated SNR for transitioning between the Wiener estimator and the averaging estimator may be determined according to equation (60) as:

$$SNR_{dB} \approx -10 \log_{10}(1+\text{sinc}(3T_d \Delta f)) - 10 \log_{10}(1+\text{sinc}(4 F_d T_{sym})). \quad (66)$$

Exemplary Estimation of SNR

In developing the hybrid estimator, it can be noted that the estimator may require knowledge of the SNR and of the 2D-ACF of the channel. While the knowledge of the 2D-ACF may be typically unavailable at the receiver, the value of SNR may be efficiently estimated. As an illustrative example of the UL-PUSC tile type, subcarriers of a ranging channel may be modulated by a pseudo noise (PN) code of length 144. Assuming that the ranging channel may be contained in the UL-PUSC zone, this may provide 36 tiles each of dimension 4×1 (i.e., four subcarriers by one OFDMA symbol).

The vector of four pilots observed from the tth tile may be denoted as $h_{t,\pi}$. The average of the four pilots within the tth tile may be denoted by $$\hat{H}_{t,av} = \sum_{i=1}^{4} h_{t,\pi,i}.$$

The noise power may be estimated per tile as $$\hat{\sigma}_t^2 = \frac{1}{4}\sum_{i=1}^{4} |h_{t,\pi,i} - \hat{H}_{t,av}|^2.$$

Then, the estimate of the SNR using $N_t=36$ tiles may be given as:

$$S\hat{N}R = 10\log_{10}\left(\frac{\frac{1}{N_t}\sum_{t=1}^{N_t} |\hat{H}_{t,av}|^2}{\frac{1}{N_t}\sum_{t=1}^{N_t} \hat{\sigma}_t^2}\right) \quad (67)$$

Exemplary Simplified Hybrid Estimator

Figure 8:
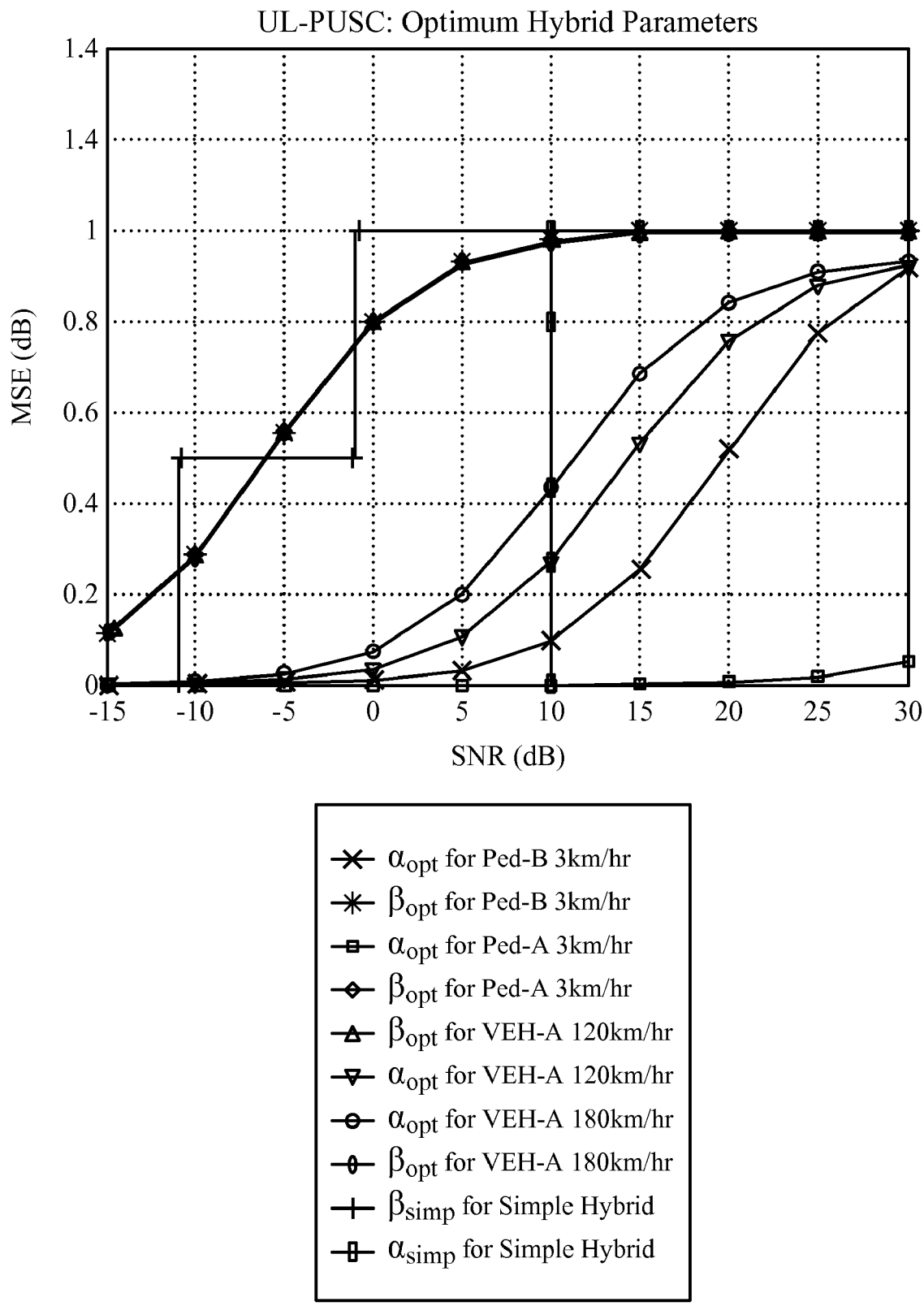
FIG. 8 shows optimal and approximated parameters of a hybrid channel estimator for the UL-PUSC tile type in various channel environments.
Figure 9:
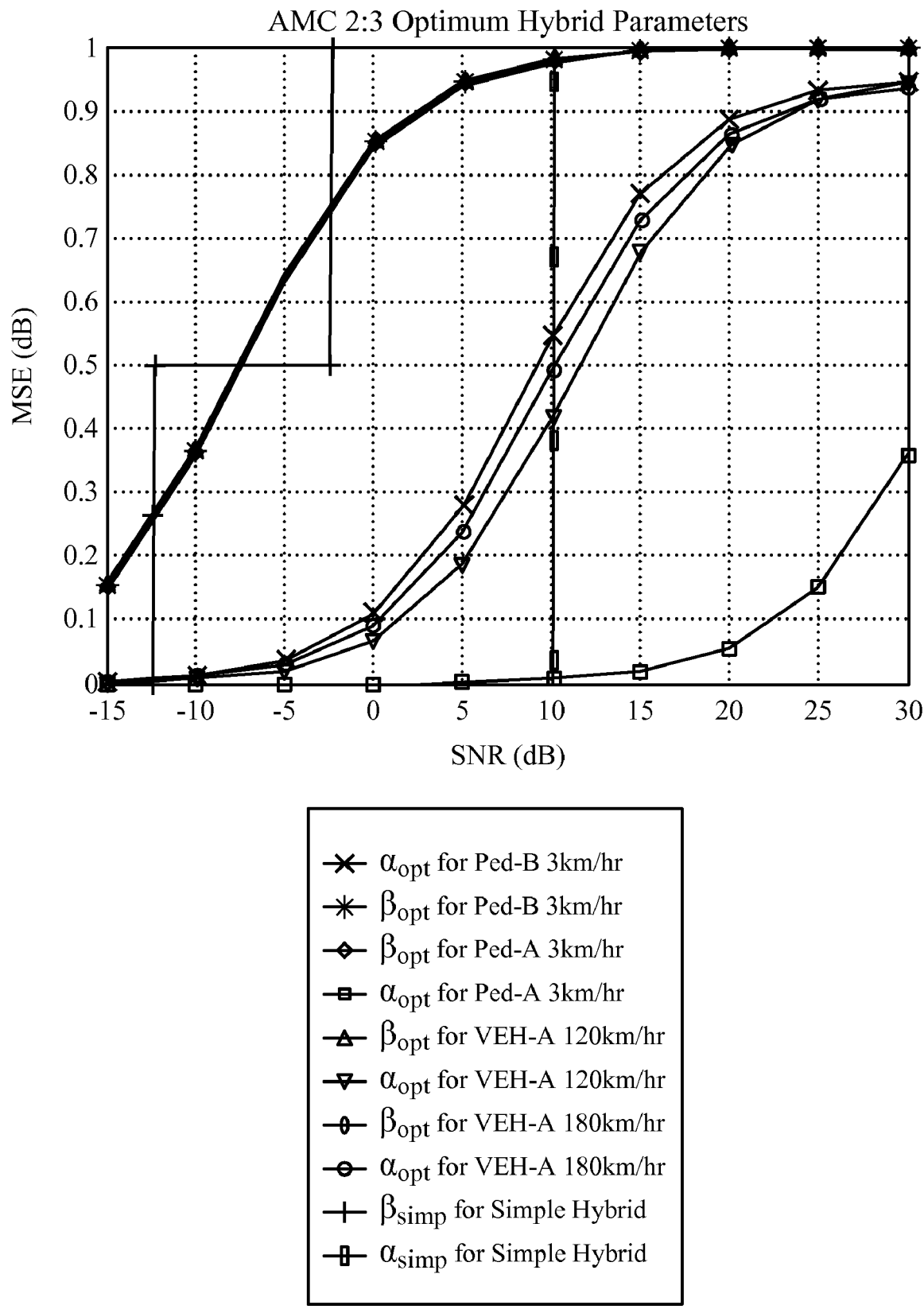
FIG. 9 shows optimal and approximated parameters of the hybrid channel estimator for the AMC 2×3 tile type in various channel environments.

A simplified hybrid estimator may be proposed in the present disclosure that does not require knowledge of the 2D-ACF of the channel. The simplified hybrid estimator may be designed from the empirical observations of values for $\alpha_{opt}$ and $\beta_{opt}$ parameters as a function of the SNR across different channel scenarios. FIG. 8 shows optimal and approximated parameters of the hybrid channel estimator for the UL-PUSC tile type in various channel environments. FIG. 9 shows optimal and approximated parameters of the hybrid channel estimator for the AMC 2×3 tile type in various channel environments.

It can be observed from both FIG. 8 and FIG. 9 that curves for $\beta_{opt}$ may change very little with channel conditions. In addition, it can be noted that the $\alpha_{opt}$ curve may shift to the left (i.e., to lower values of SNR) when the channel has a high Doppler spread (i.e., high time variations) and/or large delay spread (i.e., high frequency selectivity). This may be because the plane-fit estimator may perform better in channels with higher time/frequency variations even at lower SNR values.

From empirical observations given in FIG. 8, it appears that a reasonable worst-case scenario may be the case when $\alpha_{opt}$ takes on the value of 0.5 at SNR=10 dB. This particular empirical observation may be used to design step-function approximation for parameters $\alpha_{opt}$ and $\beta_{opt}$ that may not require knowledge of the channel 2D-ACF. Using the SNR value of 10 dB as the switch point, it can be defined a simple step function for parameter $\alpha$. A similar step function may be also defined for parameter $\beta$. The $\alpha_{simp}$ and $\beta_{simp}$ curves for the simplified hybrid estimator in the case of the UL-PUSC tile type are also shown in FIG. 8 and defined as following expressions:

$$\beta_{simp} = \begin{cases} 0 & \text{if } S\hat{N}R \leq -11\,\text{dB} \\ 0.5 & \text{if } -11\,\text{dB} < S\hat{N}R \leq -1\,\text{dB} \\ 1 & \text{if } S\hat{N}R > -1\,\text{dB,} \end{cases} \quad (68)$$

$$\alpha_{simp} = \begin{cases} 0 & \text{if } S\hat{N}R \leq 10\,\text{dB} \\ 1 & \text{if } S\hat{N}R > 10\,\text{dB.} \end{cases} \quad (69)$$

Similar approach for designing the simplified hybrid estimator may be applied in the case of AMC 2×3 tile type. The approximate values of parameters $\alpha$ and $\beta$ may have the following form irrespective of channel conditions, and are also illustrated in FIG. 9:

$$\beta_{simp} = \begin{cases} 0 & \text{if } S\hat{N}R \leq -12.5\,\text{dB} \\ 0.5 & \text{if } -12.5\,\text{dB} < S\hat{N}R \leq -2.5\,\text{dB} \\ 1 & \text{if } S\hat{N}R > -2.5\,\text{dB,} \end{cases} \quad (70)$$

$$\alpha_{simp} = \begin{cases} 0 & \text{if } S\hat{N}R \leq 10\,\text{dB} \\ 1 & \text{if } S\hat{N}R > 10\,\text{dB.} \end{cases} \quad (71)$$

Figure 10:
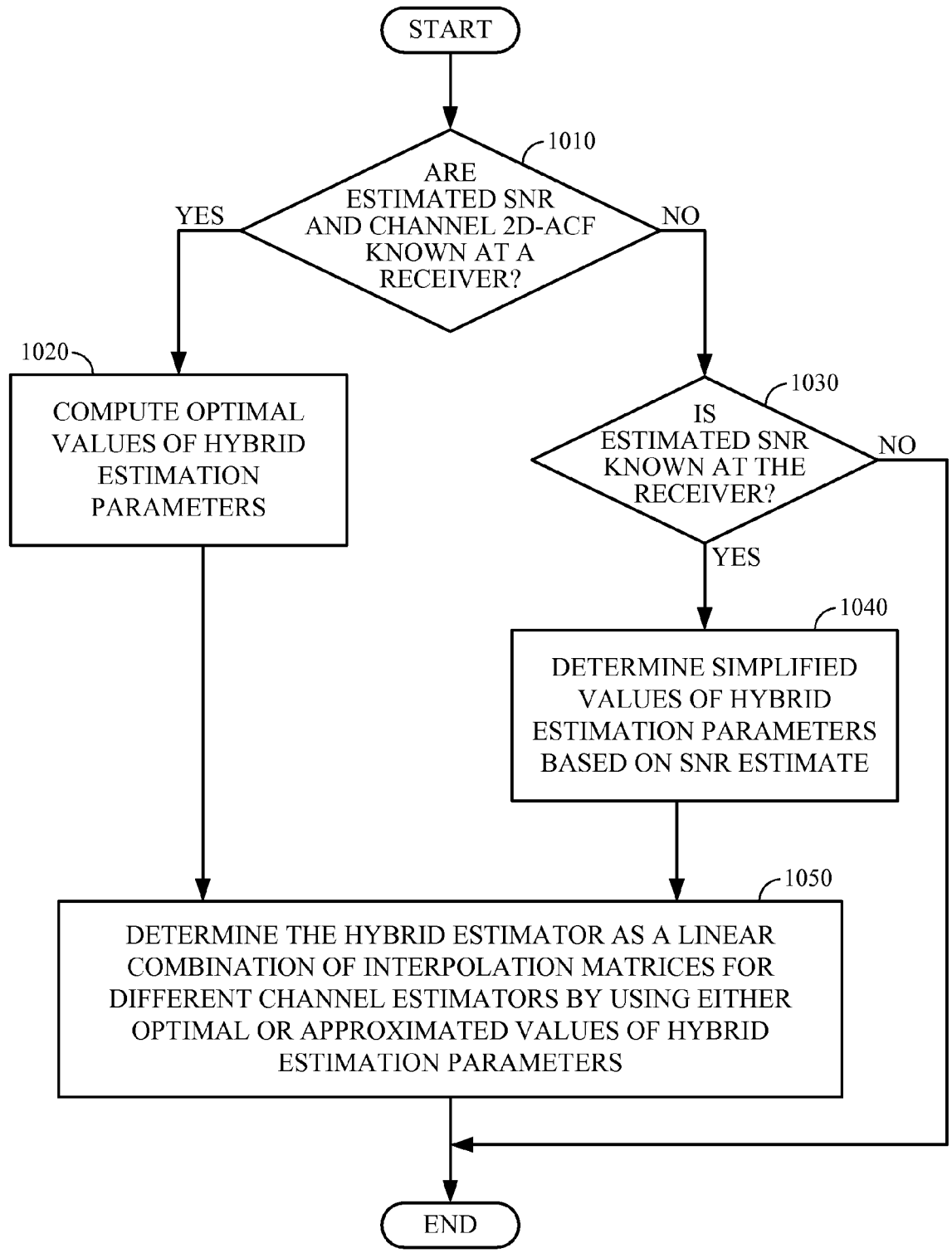
FIG. 10 illustrates a process of hybrid channel estimation in accordance with certain embodiments of the present disclosure.

FIG. 10 illustrates example operations for configuring a hybrid channel estimator based on what knowledge of the channel may be available at a receiver. At 1010, it can be checked if both the estimated SNR and the 2D-ACF of the channel are available at the receiver. If the knowledge about both the SNR estimate and the channel 2D-ACF is available at the receiver, then optimal values of parameters $\alpha_1, \alpha_2, \ldots, \alpha_N$ from equation (43) may be computed, at 1020. Parameters $\alpha_1, \alpha_2, \ldots, \alpha_N$ characterize the hybrid estimator transitioning amongst up to N lower complexity linear estimators.

On the other hand, if the SNR is estimated at the receiver and the 2D-ACF of the channel is not available (decision step 1030), then the simplified values of parameters $\alpha_1, \alpha_2, \ldots, \alpha_N$ may be determined, at 1040, according to the estimated SNR value. Finally, at 1050, the hybrid estimator may be determined as a linear combination of interpolation matrices for different channel estimators by using either optimal or approximated values of parameters $\alpha_1, \alpha_2, \ldots, \alpha_N$.

Exemplary Simulation Results

Figure 11:
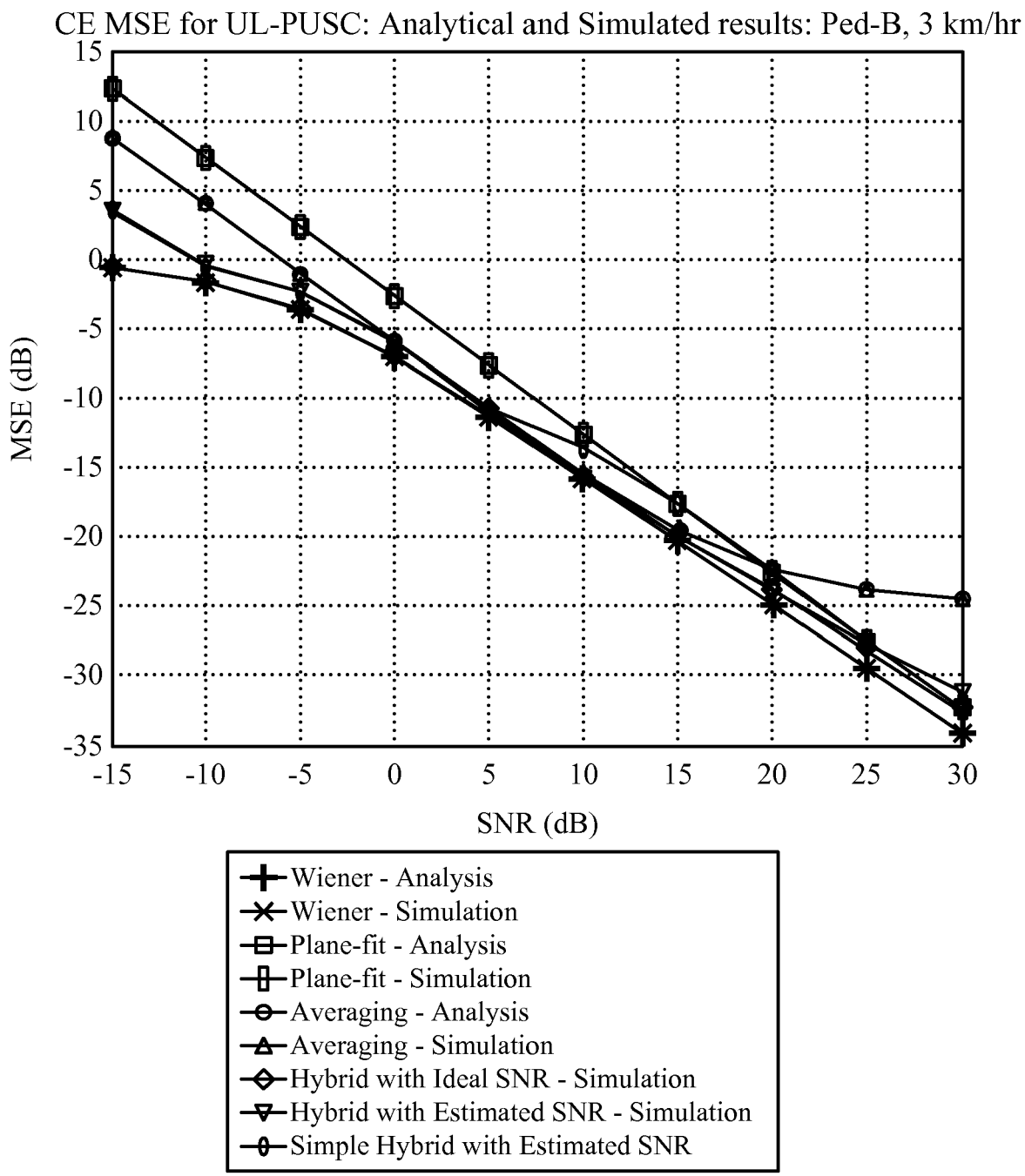
FIG. 11 shows the UL-PUSC mean square error (MSE) performance of Wiener estimator, plane-fit estimator, averaging estimator, hybrid estimator with perfect knowledge of signal-to-noise ratio (SNR), hybrid estimator with estimated SNR, and simplified hybrid estimator.
Figure 12:
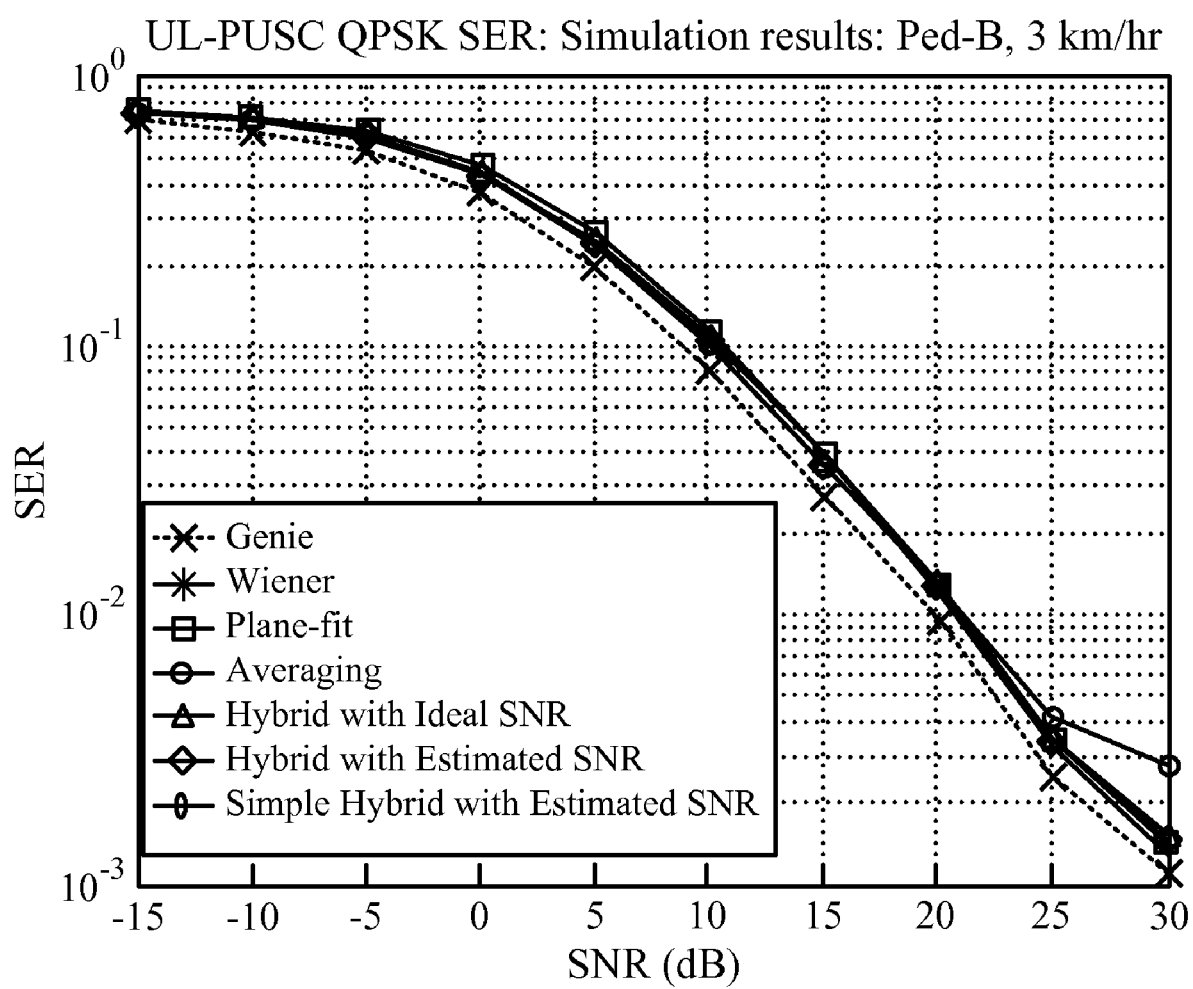
FIG. 12 shows the UL-PUSC symbol error rate (SER) performance of Wiener estimator, plane-fit estimator, averaging estimator, hybrid estimator with perfect knowledge of SNR, hybrid estimator with estimated SNR, and simplified hybrid estimator.

FIG. 11 shows the UL-PUSC mean square error (MSE) performance of Wiener estimator, plane-fit estimator, averaging estimator, hybrid estimator with perfect knowledge of signal-to-noise ratio (SNR), hybrid estimator with estimated SNR, and simplified hybrid estimator. FIG. 12 shows the UL-PUSC symbol error rate (SER) performance of Wiener estimator, plane-fit estimator, averaging estimator, hybrid estimator with perfect knowledge of SNR, hybrid estimator with estimated SNR, and simplified hybrid estimator. For both figures, the Pedestrian B channel can be assumed with a speed of mobile subscriber of 3 km/h. The hybrid estimators from FIG. 11 and FIG. 12 may assume the combination of the Wiener estimator, the averaging estimator and the plane-fit estimator, as given by equation (38).

It can be observed from FIG. 11 that the performance of the simplified hybrid estimator may transition between that of averaging and plane-fit estimators, though the simplified hybrid estimator may not be as close to the Wiener bound as the hybrid estimator with optimal parameters. However, as observed in FIG. 12, which shows the corresponding SER for the QPSK modulation applied at the transmitter, the error rate performance of the simplified hybrid estimator may be near the Wiener error rate performance across the entire illustrated SNR range.

Therefore, according to simulation results from FIG. 11 and FIG. 12, the hybrid estimator as defined by equation (38) may be chosen as a solution for channel estimation of the UL-PUSC pilot/data structure with parameters $\alpha$ and $\beta$ defined by equation (69) and equation (68), respectively. The simplified hybrid estimator may provide simplicity of implementation and good error rate performance. For the implementation purpose, the SNR estimate may be obtained by the searcher and it represents an input to the simplified hybrid estimator. The searcher may utilize the ranging channel on the uplink.

Figure 13:
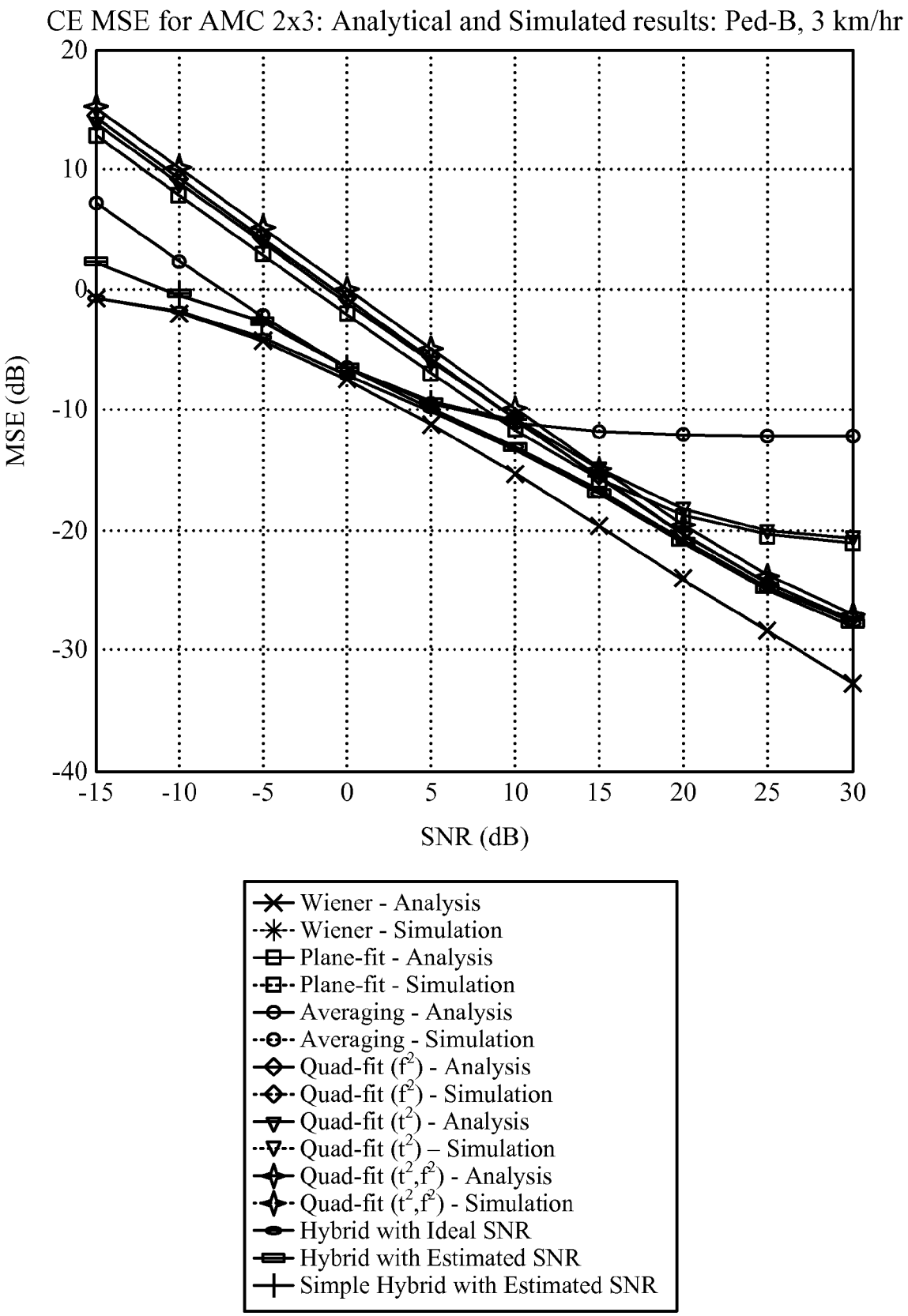
FIG. 13 shows the AMC 2×3 MSE performance of Wiener estimator, plane-fit estimator, averaging estimator, quadratic-fit estimator, hybrid estimator with perfect knowledge of SNR, hybrid estimator with estimated SNR, and simplified hybrid estimator.
Figure 14:
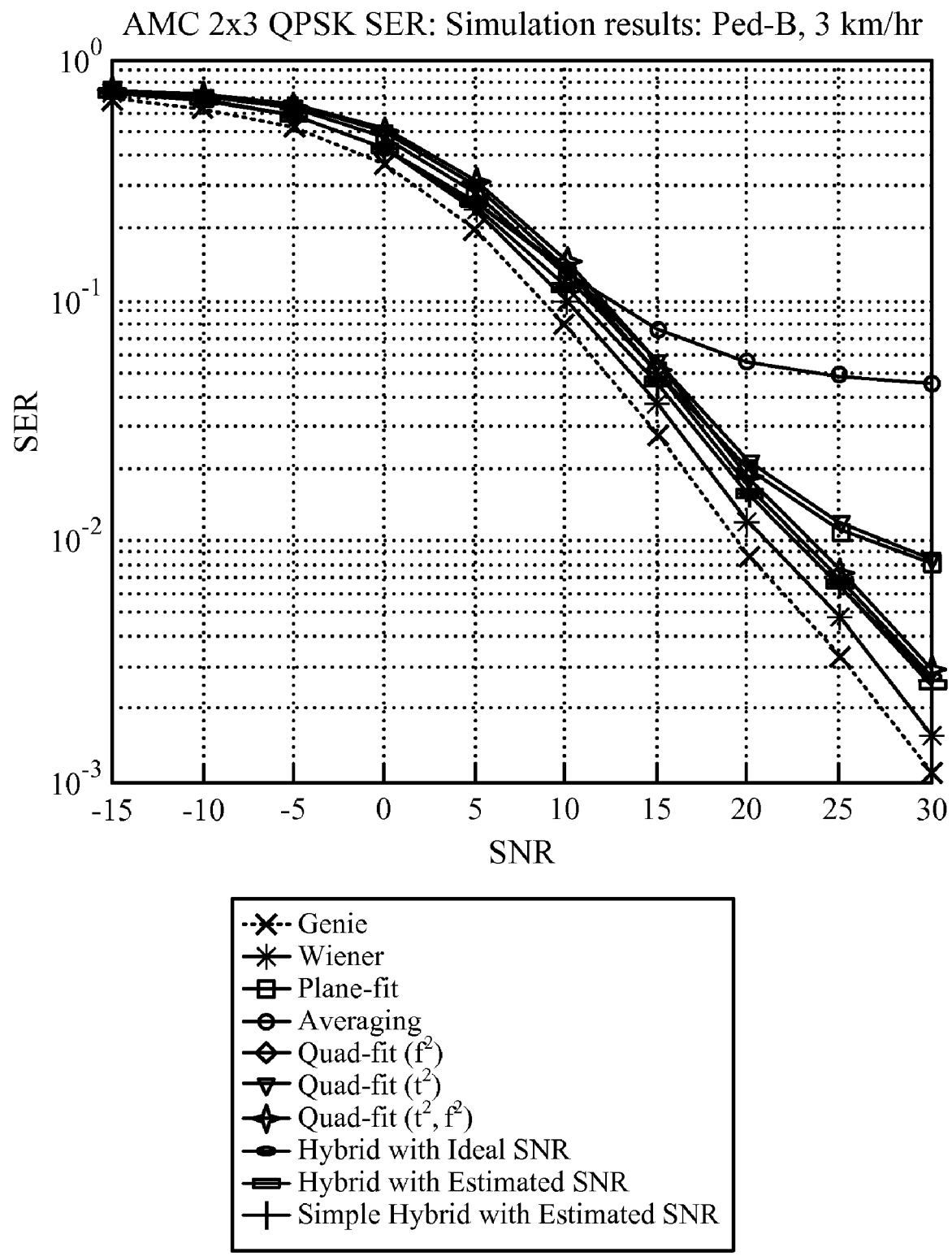
FIG. 14 shows the AMC 2×3 SER performance of Wiener estimator, plane-fit estimator, averaging estimator, quadratic-fit estimator, hybrid estimator with perfect knowledge of SNR, hybrid estimator with estimated SNR, and simplified hybrid estimator.

FIG. 13 shows the AMC 2×3 MSE performance of Wiener estimator, plane-fit estimator, averaging estimator, quadratic-fit estimator, hybrid estimator with perfect knowledge of SNR, hybrid estimator with estimated SNR, and simplified hybrid estimator. FIG. 14 shows the AMC 2×3 SER performance of Wiener estimator, plane-fit estimator, averaging estimator, quadratic-fit estimator, hybrid estimator with perfect knowledge of SNR, hybrid estimator with estimated SNR, and simplified hybrid estimator. For both figures, the Pedestrian B channel can be assumed with the speed of mobile subscriber or 3 km/h. The hybrid estimators from FIG. 13 and FIG. 14 may assume the combination of the Wiener estimator, the averaging estimator and the quadratic-fit estimator with f2 coefficient, as given by equation (40).

It can be noted from FIG. 13 that the hybrid estimator with optimal parameters and the simplified hybrid estimator with approximated values of parameters both track the performance of the averaging estimator at low SNR and that of the quadratic-fit estimator at high SNR, thereby providing significant advantages when compared to either estimator alone. The simplified hybrid estimator may not perform as well as the optimal hybrid estimator in the transition region around 10 dB. However, their QPSK-SER performances are nearly indistinguishable as shown in FIG. 14. Moreover, it can be observed from FIG. 14 that the error rate performance of both the hybrid estimator with optimal parameters and the simplified hybrid estimator is nearly 2.5 dB better than the quadratic-fit estimator at low SNR.

Therefore, according to simulation results from FIG. 13 and FIG. 14, the hybrid estimator as defined by equation (40) may be the estimator of choice for the AMC 2×3 tile type with approximated parameters $\alpha$ and $\beta$ defined by equation (71) and equation (70), respectively. The simplified hybrid estimator may provide simplicity of implementation and good error rate performance for the large variety of channel scenarios.

Figure 7A:
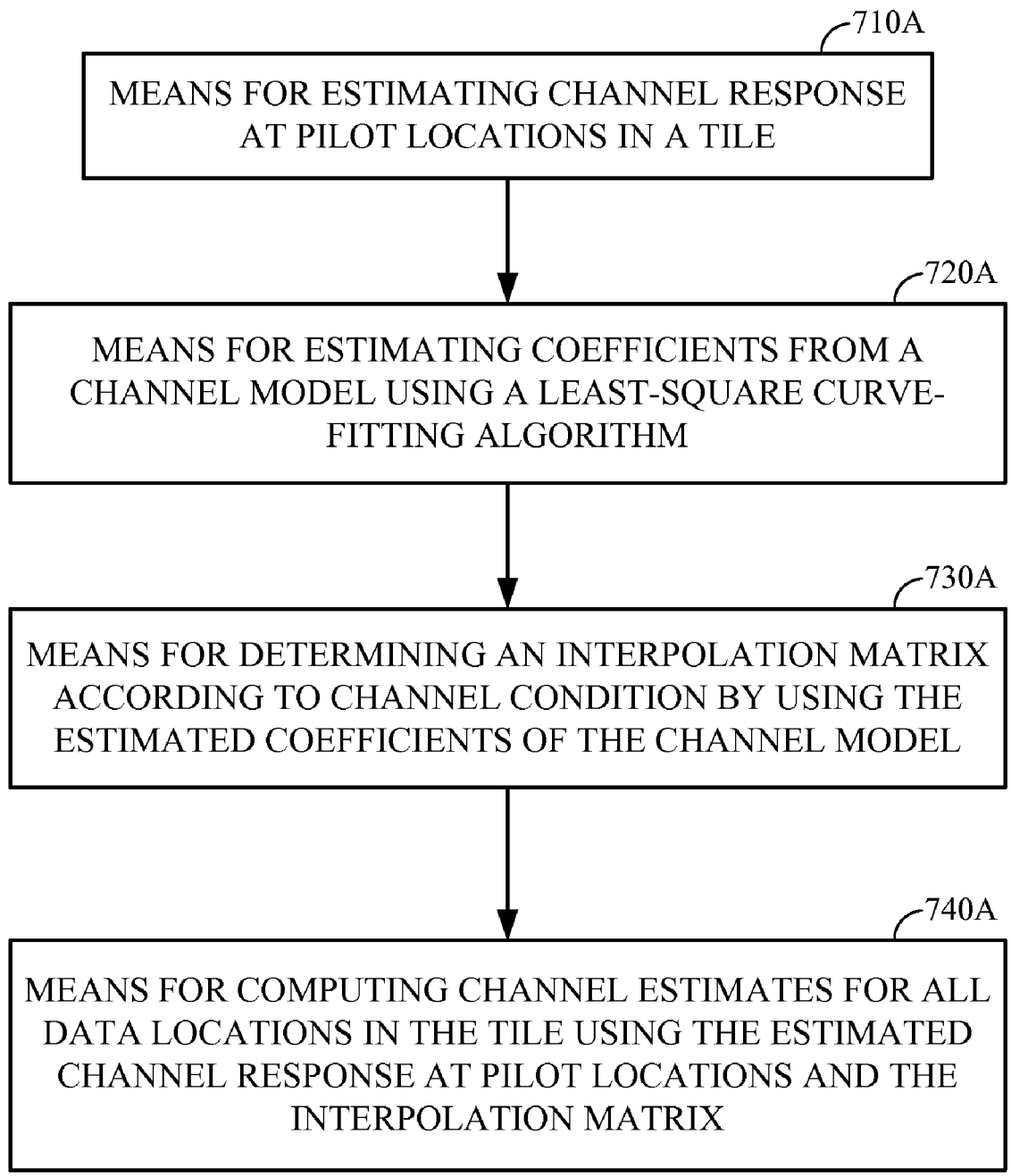
FIG. 7A illustrates example components capable of performing the operations illustrated in FIG. 7.
Figure 10A:
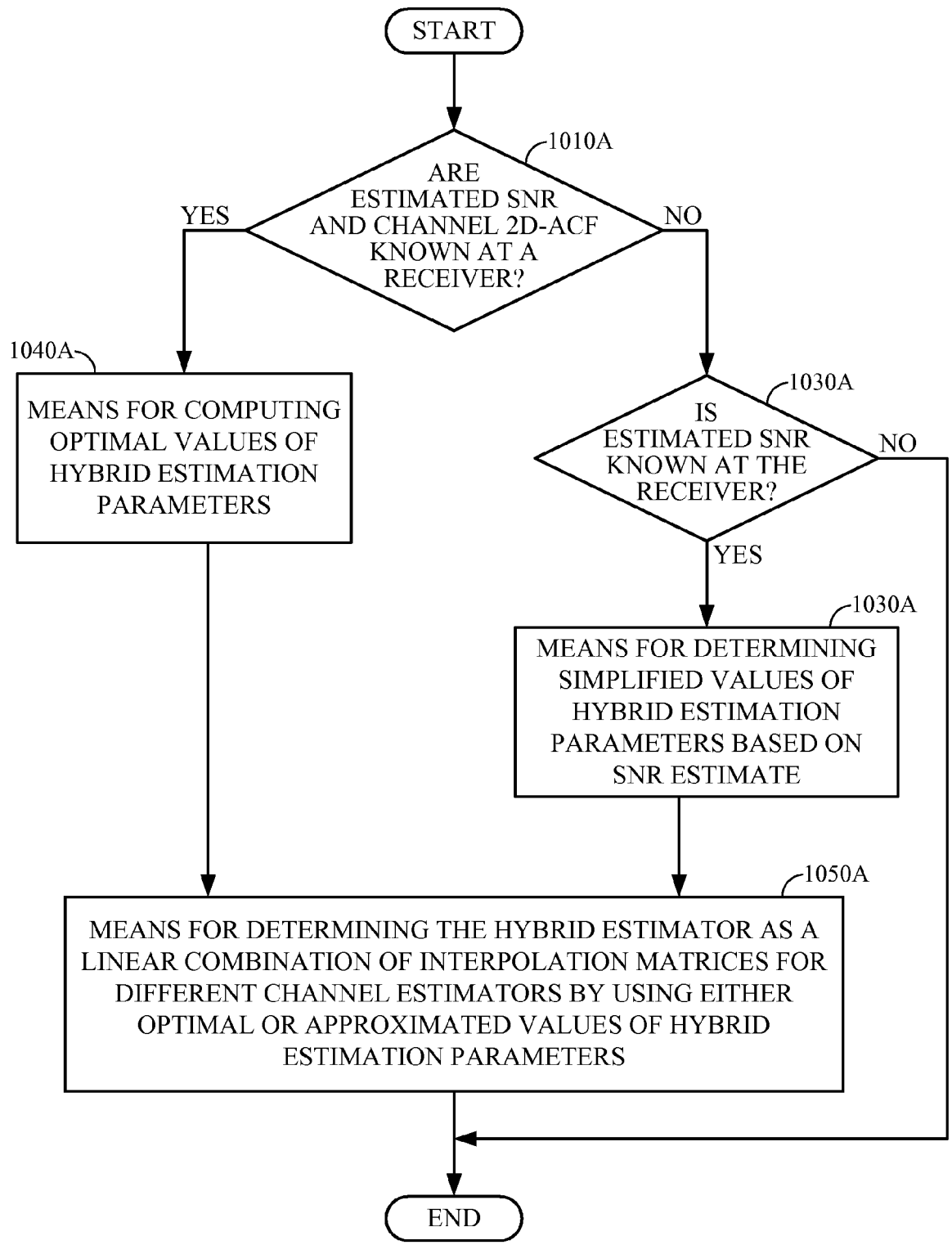
FIG. 10A illustrates example components capable of performing the operations illustrated in FIG. 10.

The various operations of methods described above may be performed by various hardware and/or software component(s) and/or module(s) corresponding to means-plus-function blocks illustrated in the Figures. For example, blocks 710-740 illustrated in FIG. 7 correspond to means-plus-function blocks 710A-740A illustrated in FIG. 7A. Similarly, blocks 1010-1050 illustrated in FIG. 10 correspond to means-plus-function blocks 1010A-1050A illustrated in FIG. 10A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for estimating a channel in a wireless communication system comprises:
   computing values of scaling parameters using an estimated signal-to-noise ratio (SNR) value and a two-dimensional auto-correlation function (2D-ACF) of the channel;
   obtaining approximated values of scaling parameters based on the estimated value of SNR, if the estimated SNR value is known at the receiver and if the 2D-ACF is not known at the receiver;
   determining a linear combination of interpolation matrices that correspond to different constituent channel estimators based on computed scaling parameters; and
   calculating channel estimates at locations in a tile other than pilot locations in the tile by using the determined interpolation matrix and known channel estimates at the pilot locations.

2. The method of claim 1 wherein the constituent channel estimators comprise an averaging estimator and a plane-fit estimator for an uplink partially used subcarriers (UL-PUSC) tile type.

3. The method of claim 1 wherein the constituent channel estimators comprise an averaging estimator, a plane-fit estimator, and the Wiener estimator for an uplink partially used subcarriers (UL-PUSC) tile type.

4. The method of claim 1 wherein the constituent channel estimators comprise an averaging estimator, the Wiener estimator, and a quadratic-fit estimator with a frequency-squared component of the channel over the particular time-frequency region for an adaptive modulation and coding (AMC) 2×3 tile type.

5. The method of claim 1 further comprising:
   computing an approximated value of SNR based on a Doppler frequency and a delay spread, wherein the computed SNR value represents offset value for transitioning between different constituent channel estimators.

6. The method of claim 5 wherein the constituent channel estimators comprise an averaging estimator and a plane-fit estimator.

7. The method of claim 5 wherein the constituent channel estimators comprise the Wiener estimator and an averaging estimator.

8. An apparatus for estimating a channel in a wireless communication system comprises:
   logic for computing values of scaling parameters using an estimated signal-to-noise ratio (SNR) value and a two-dimensional auto-correlation function (2D-ACF) of the channel;
   logic for obtaining approximated values of scaling parameters based on the estimated value of SNR, if the estimated SNR value is known at the receiver and if the 2D-ACF is not known at the receiver;
   logic for determining a linear combination of interpolation matrices that correspond to different constituent channel estimators based on computed scaling parameters; and
   logic for calculating channel estimates at locations in a tile other than pilot locations in the tile by using the determined interpolation matrix and known channel estimates at the pilot locations.

9. The apparatus of claim 8 wherein the constituent channel estimators comprise an averaging estimator and a plane-fit estimator for an uplink partially used subcarriers (UL-PUSC) tile type.

10. The apparatus of claim 8 wherein the constituent channel estimators comprise an averaging estimator, a plane-fit estimator, and the Wiener estimator for an uplink partially used subcarriers (UL-PUSC) tile type.

11. The apparatus of claim 8 wherein the constituent channel estimators comprise an averaging estimator, the Wiener estimator, and a quadratic-fit estimator with a frequency-squared component of the channel over the particular time-frequency region for an adaptive modulation and coding (AMC) 2×3 tile type.

12. The apparatus of claim 8 further comprising:
   logic for computing an approximated value of SNR based on a Doppler frequency and a delay spread, wherein the computed SNR value represents offset value for transitioning between different constituent channel estimators.

13. The apparatus of claim 12 wherein the constituent channel estimators comprise an averaging estimator and a plane-fit estimator.

14. The apparatus of claim 12 wherein the constituent channel estimators comprise the Wiener estimator and an averaging estimator.

15. An apparatus for estimating a channel in a wireless communication system comprises:
   means for computing values of scaling parameters using an estimated signal-to-noise ratio (SNR) value and a two-dimensional auto-correlation function (2D-ACF) of the channel;
   means for obtaining approximated values of scaling parameters based on the estimated value of SNR, if the estimated SNR value is known at the receiver and if the 2D-ACF is not known at the receiver;
   means for determining a linear combination of interpolation matrices that correspond to different constituent channel estimators based on computed scaling parameters; and
   means for calculating channel estimates at locations in a tile other than pilot locations in the tile by using the determined interpolation matrix and known channel estimates at the pilot locations.

16. The apparatus of claim 15 wherein the constituent channel estimators comprise an averaging estimator and a plane-fit estimator for an uplink partially used subcarriers (UL-PUSC) tile type.

17. The apparatus of claim 15 wherein the constituent channel estimators comprise an averaging estimator, a plane-fit estimator, and the Wiener estimator for an uplink partially used subcarriers (UL-PUSC) tile type.

18. The apparatus of claim 15 wherein the constituent channel estimators comprise an averaging estimator, the Wiener estimator, and a quadratic-fit estimator with a frequency-squared component of the channel over the particular time-frequency region for an adaptive modulation and coding (AMC) 2×3 tile type.

19. The apparatus of claim 15 further comprising:
   means for computing an approximated value of SNR based on a Doppler frequency and a delay spread, wherein the computed SNR value represents offset value for transitioning between different constituent channel estimators.

20. The apparatus of claim 19 wherein the constituent channel estimators comprise an averaging estimator and a plane-fit estimator.

21. The apparatus of claim 19 wherein the constituent channel estimators comprise the Wiener estimator and an averaging estimator.

22. A computer-program product for estimating a channel in a wireless communication system, comprising a computer readable medium having instructions stored thereon, the instructions being executable by one or more processors and the instructions comprising:

instructions for computing values of scaling parameters using an estimated signal-to-noise ratio (SNR) value and a two-dimensional auto-correlation function (2D-ACF) of the channel;

instructions for obtaining approximated values of scaling parameters based on the estimated value of SNR, if the estimated SNR value is known at the receiver and if the 2D-ACF is not known at the receiver;

instructions for determining a linear combination of interpolation matrices that correspond to different constituent channel estimators based on computed scaling parameters; and instructions for calculating channel estimates at locations in a tile other than pilot locations in the tile by using the determined interpolation matrix and known channel estimates at the pilot locations.

23. The computer-program product of claim 22 wherein the constituent channel estimators comprise an averaging estimator and a plane-fit estimator for an uplink partially used subcarriers (UL-PUSC) tile type.

24. The computer-program product of claim 22 wherein the constituent channel estimators comprise an averaging estimator, a plane-fit estimator, and the Wiener estimator for an uplink partially used subcarriers (UL-PUSC) tile type.

25. The computer-program product of claim 22 wherein the constituent channel estimators comprise an averaging estimator, the Wiener estimator, and a quadratic-fit estimator with a frequency-squared component of the channel over the particular time-frequency region for an adaptive modulation and coding (AMC) 2×3 tile type.

26. The computer-program product of claim 22 wherein the instructions further comprise:

instructions for computing an approximated value of SNR based on a Doppler frequency and a delay spread, wherein the computed SNR value represents offset value for transitioning between different constituent channel estimators.

27. The computer-program product of claim 26 wherein the constituent channel estimators comprise an averaging estimator and a plane-fit estimator.

28. The computer-program product of claim 26 wherein the constituent channel estimators comprise the Wiener estimator and an averaging estimator.

* * * * *